United States Patent Office 3,504,771
Patented Apr. 7, 1970

3,504,771
ELEVATOR SUPERVISORY SYSTEM
John Suozzo and Henry C. Savino, Hackensack, N.J., assignors to Westinghouse Electric Corporation, Pittsburgh, Pa., a corporation of Pennsylvania
Filed Oct. 17, 1967, Ser. No. 675,879
Int. Cl. B66b 1/18
U.S. Cl. 187—29                31 Claims

ABSTRACT OF THE DISCLOSURE

A zoned demand elevator supervisory system in which cars can become available at any floor at which they complete a trip including the main floor and the basement. Available cars located in a zone are associated with a particular zone although they will not necessarily be located in, nor be dispatched to serve demands within, the associated zone. Cars are only dispatched in response to car calls or specific demands for service some of which are artificially created by the system. The demands for service are given preference in accordance with a pattern determined by one of several automatically selected modes of operation. Demands for service can be cancelled or denied registration if the system senses that another car is in position or will soon be in a position to satisfy the calls creating the demand. Available cars are then assigned to serve a demand for service which has been given preference in accordance with a predetermined selection pattern associated with the particular demand.

BACKGROUND OF THE INVENTION

This invention relates to vehicular systems, and has particular relation to elevator systems wherein a plurality of elevator cars are arranged in a structure to operate as a bank.

This invention is particularly directed toward providing a highly efficient elevator system for a low rise building or one with light traffic by increasing the flexibility of a minimum number of cars.

One of the major obstacles to the design of an efficient elevator system is the wide variation in the requirements for service which can be encountered at different times of the day or week by a particular installation. For instance, in a typical office building there is a great demand for up service from the lower terminal floor at the commencement of the working day and following the lunch break, while there is an even more intensive demand for down service at the beginning of the lunch break and at the close of the working day. In between these periods of large demands for service in one direction, there are periods of relatively light demands for service fairly well balanced between up and down demands. At night and on non-working days demands for service may be practically non-existent.

Systems have been developed over the years which attempt to provide equitable and efficient service despite the fluctuations in traffic demands. The present state of the art includes systems in which the floors of the building are divided into zones and in which elevator cars are dispatched in response to demands for service in a particular zone. The elevator system disclosed in our Patent No. 3,256,958 is an example of such a system. In that system cars become available for assignment from the floors at which they complete their prior assignments. In this manner, cars become distributed randomly throughout the hatchway and thus cars are in better position to more quickly serve demands. The system was designed for large banks of elevators in high rise buildings, and therefore a great deal of flexibility was built into the system to accommodate for the wide variations in traffic demands that would be encounted in such a situation.

SUMMARY OF THE INVENTION

The present system is designed to offer an efficient and flexible system for a small bank of elevators in a low rise building or one with moderate traffic demands where cost considerations do not justify the sophistication of the system disclosed in our prior patent. In accordance with the invention, cars can become available at any floor regardless of direction of travel if they have completed their assignment, they have not been reassigned, and there are no calls, either corridor calls or car calls, ahead of them in the direction in which they were traveling. The present system is a zoned system in which cars are dispatched only in response to specific requirements for service. As the cars become available they are individually identified by designating them as being available for a particular zone or if they are at the main floor they may be designated as the "next" available car or the "non-next" available car. (The "next" designation indicates that that car is selected as the car to be boarded by passengers at the main floor desiring elevator service.) Although a car associated with a particular zone is primarily available to serve demands in that zone, it may be assigned to other demands. At times this is true even if there are demands in the zone with which it is associated. In addition, the cars are not necessarily designated as available in the zone in which they become available. Furthermore the designation of a car as being available for a particular zone can be changed depending upon the activity of the other cars in the interest of maximizing efficiency. An additional feature of this invention is that a car can become available at the basement level if there is a demand for service.

As mentioned previously, cars are dispatched in accordance with specific requirements for service. This includes demands for service which are created by the registering of corridor calls by prospective passengers and by special functions which will be described below. These demands are given preferences when cars are dispatched in accordance therewith. In order to obtain the most efficient service out of the few cars available in the system, demands can be cancelled or even not registered if the situation is such that a car on another assignment is position or will be available shortly to answer the call.

Although not limited to any such specific figures, the system can be more easily described by considering a system having two zones of floors in addition to a main floor and a basement, and comprising three elevator cars. The two zones will be referred to as the low zone and the high zone. If a first car becomes available in the low zone it will be designated as the low zone available car and will be available for assignment to demands from that point. If a second car now also becomes available in the low zone, it will be designated as the high zone available car despite the fact that it is physically located in the low zone. If the low zone available car is subsequently assigned to answer a demand for service, it loses its low zone available car designation and the aforesaid second car, which it will be remembered is located physically in the low zone, will be designated as the low zone available car. Similarly, the first car to become available in the high zone will be designated as the high zone available car and the second car to become available in that zone will become the low zone available car, but would be redesignated as the high zone available car if the first car in the high zone were subsequently given an assignment. To return to the situation where the high zone and the low zone available cars are both located in the low zone, if the third car is now dispatched from the lower terminal floor, the system will seek the low zone available car and return it to the main floor. The other available car in the low zone will then become the low zone available car. Furthermore, a car which completes its assigned task in the basement will become available for assignment from that position if a demand for service then exists. If there are no demands for service, the car will be returned to the main floor. Thus a certain flexibility is maintained and the available car designations are regulated to best meet the existing traffic situation.

Although an available car may be associated with a particular zone, it does not necessarily mean that that car will be assigned to demands in the associated zone. The car may be dispatched to answer a demand in another zone, and this can occur even though there is a demand for service in the zone with which the car is associated. For instance, if there are down demands in both the low zone and the high zone, the low zone available car will be assigned to answer the down demand in the high zone if there is no high zone available car and no other car in position to answer the call creating the demand. This will occur because demands are only recognized one at a time for the purpose of assigning available cars and they are recognized according to an order of preference which may be varied in accordance with the existing traffic sitaution.

Under balanced traffic conditions demands are given preference in the following order: up demands in the low zone, up demands in the high zone, down demands in the high zone, down demands in the low zone, basement demands, and last, main floor demands. The main floor demand is given last preference because it is actually an artificial demand which is created when there is no car at the main floor and there is no prospect of one arriving there shortly. It is desirable to return a car to the main floor so that a person entering the building will find a waiting car. Ordinarily most passengers traveling down are going to the main floor so that cars are constantly being returned there. Even if the car is assigned to the basement it will soon return to the main floor. Therefore, a main floor demand will be created only if there is no car at the main floor, there is no car traveling down other than ones assigned to up demands, there is no car at the basement or assigned to the basement and the system is not conditioned for down peak operation since then the main concern is with down corridor calls. If a main floor demand is given preference, i.e. there are no other demands, the system will seek the low zone available car and return it to the main floor. If there is no low zone available car, the high zone available car will be selected.

The sequence in which the demands for service are preferred is modified somewhat when there is a large demand for service in the down direction. The situation is known as down peak and is indicated by the existence of a car traveling in the down direction which is loaded to capacity while down calls still remain unanswered in the high zone or the low zone. During down peak conditions, preference is given to the down demands over the up demands while basement and main floor demands are cut out entirely. In order to equalize down service during down peak operation, preference is alternated between down demands in the high zone and down demands in the low zone. To further improve service during these down peak conditions, available cars will be dispatched to the highest down call that is unanswered. This is done because it is possible to have the situation exist where there are no demands but yet there are down calls left unanswered in both the high zone and the low zone. Where there are more cars in the system than there are zones, it is possible to have an available car and nowhere for it to be assigned even though there may be a number of down calls. For example, assume that in the three car-two zone system, one car is traveling down in the high zone and the down calls are all below the car, while at the same time another car is traveling down in the low zone with all the down calls in the low zone below the car. Under these conditions, no down demands exist, and if at the same time there are no up demands, an available car would have nowhere to go. Rather than have an available car stand idle, this invention proposes that it be dispatched to the highest down call so that maximum effort is directed during down peak conditions to answering down corridor calls.

An up peak traffic condition is indicated to the system when any car leaves the main floor in the up direction with a heavy load. Under these conditions demands are preferred in the same order as they are under balanced conditions, that is, up demands are given preference over the down demands followed by basement demands and main floor demands. However, under up peak conditions cars which have completed their assignments above the main floor and have not been assigned to answer any demand will be returned to the main floor.

Once the system has been conditioned for up peak or down peak service it will remain in that condition for a specified time. This is done to prevent the system from switching traffic patterns in response to momentary traffic situations.

In an effort to obtain maximum service with a minimum number of cars, certain demands for service will be cancelled or not registered where the system senses that a car presently on another assignment is in position, or will soon be in a position, to answer the calls which created or would create the demand for service. As an example, a car traveling down in the low zone and not assigned to up demands will cancel or prevent the registration of a demand for down service in the low zone if none of the down calls in the low zone are above the car. A car traveling down in the high zone and not assigned to up demands will also cancel or prevent the registration of down demands in the low zone if the demand for service in the low zone is not given first preference for assignment before the car is traveling down in the high zone with no further down corridor calls below it in the high zone. Under both of these conditions it is clear that a car is in a position to answer these down calls in the low zone in short order, and hence there is no reason for dispatching another car to serve these calls.

In addition, any car traveling up in the high zone will cancel or prevent the registration of a down demand in the high zone if there are also down calls in the low zone and no car is in position or assigned to answer those low zone down calls. This is done in anticipation that the car traveling up in the high zone will become available shortly and be in a position to answer the down calls in the high zone. In the meantime, an available car can be assigned to the low zone down demands instead of the high zone down demands. However, if there is an available car located physically in the high zone the down demand in the high zone will not be cancelled or denied registration. This is provided for because normally down demands in the high zone are given preference over down demands in the low zone and the available car is in position to answer the down demand in the high zone the quickest without prejudicing the down demands in low zone.

As evident from the above discussion, the invention is directed toward a flexible elevator control system which accommodates not only for shifting traffic patterns but for the instantaneous traffic situation in order to provide efficient elevator service with a minimum number of cars.

It is therefore a first object of this invention to provide an improved elevator system comprising a bank of elevator cars.

It is a second object of the invention to provide an improved elevator system comprising a bank of elevator cars which automatically accommodates for variations in traffic demands.

It is a third object of the invention to provide an improved elevator system as described in the previous object in which the floors to be served thereby are divided into a plurality of zones and in which cars dispatched to serve demands for service within a particular zone will ignore demands for service in other zones.

It is a fourth object of the invention to provide an improved elevator system as described in the third object in which cars can become available for service at any floor served thereby and in which the first car which becomes available in a particular zone will be designated as the available car for that zone, and the second car to become available in that zone will be designated as available car for another zone which does not already have an available car assigned to it.

It is a fifth object of the invention to provide an improved elevator system as described in the preceding object in which the designation of an available car as being available for service in a particular zone can be changed in response to variations in the traffic situation.

It is a sixth object of the invention to provide an improved elevator system as described in the fourth object in which demands for elevator service are satisfied in a preferred order by the assignment to those demands of available cars in accordance with the pattern which is optimum for the existing situation.

It is a seventh object of the invention to provide an improved elevator system as described in the third object in which demands for service can be cancelled or not registered when a car is in position or will shortly be in position to serve that demand.

It is an eighth object of the invention to provide an improved elevator system including a floor below the lower terminal floor from which an elevator car can become available if a demand for service exists.

It is a ninth object of the invention to provide an improved elevator system as described in the sixth object in which the order of preference assigned the demands for service may be varied to meet the general traffic situation and in which certain particular demands may be given alternating preference within a given pattern upon the occurrence of predetermined conditions.

Other objects and advantages of the invention will be apparent from the following description, taken in conjunction with the accompanying drawings, in which:

DESCRIPTION OF THE PREFERRED EMBODIMENT

Figure 1:
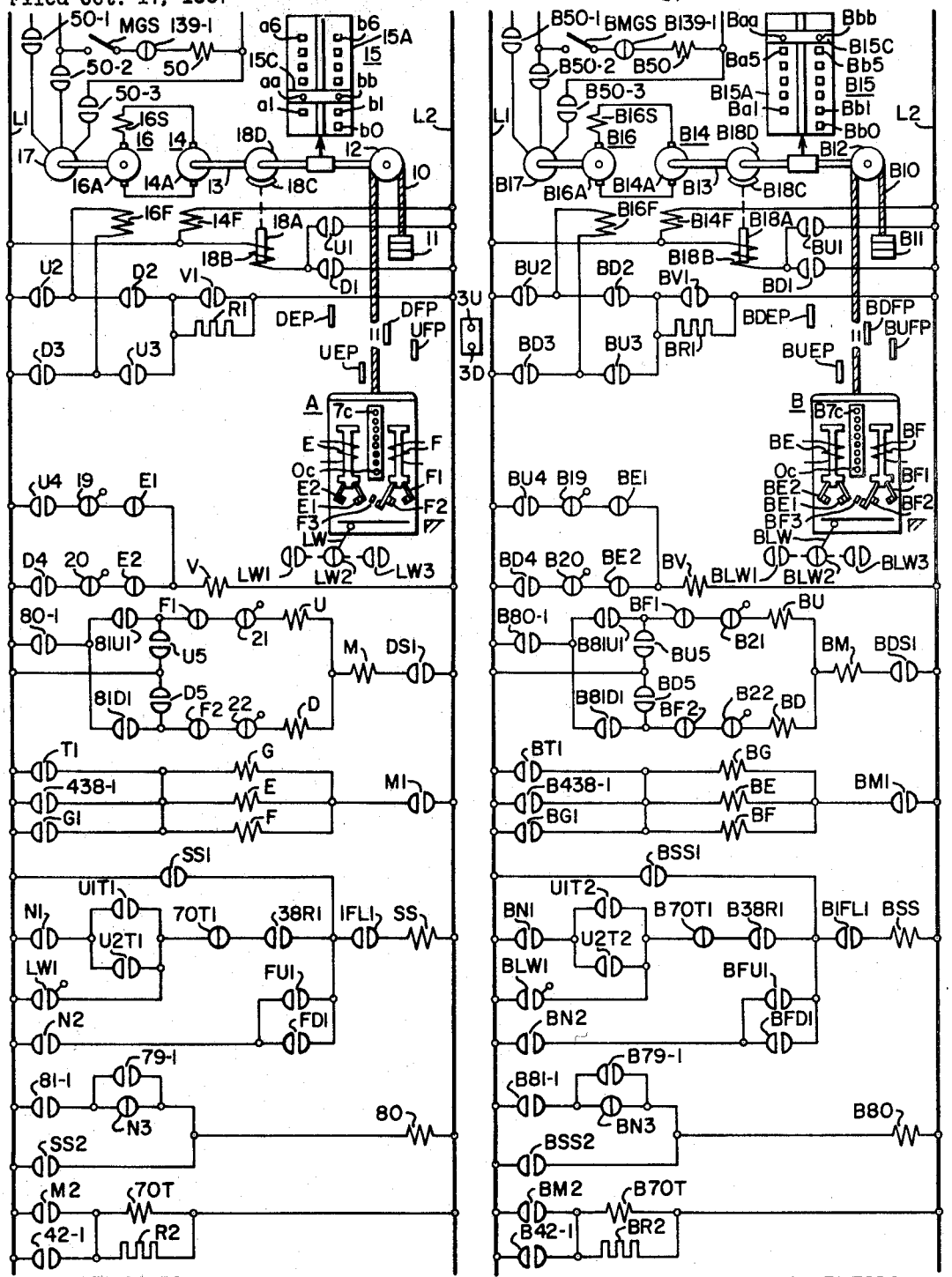
FIGURE 1 is a schematic view in straight line form of a portion of an elevator control system embodying the invention.

Although aspects of the invention may be incorporated in a vehicular system having several vehicles or cars, arranged either for attendant operation or for automatic operation to serve any desired number of landings, the invention may be described adequately with reference to an elevator system having three elevator cars serving a building or structure having seven floors and a basement and arranged for fully automatic operation. In the system described the first floor will be considered the main floor, the second, third and fourth floors will comprise the low zone and the fifth, sixth and seventh floors will be designated as the high zone. For purposes of illustration, only one basement floor will be considered although the principles involved could be applied to a system having multiple extension floors below the main floor.

Since our prior Patent 3,256,958 described a modern elevator system in great detail, it is suggested that someone unfamiliar with the elevator field refer to that patent for basic explanations of elevator apparatus. Whenever possible, that is whenever the nature of this invention does not require specialized apparatus, the apparatus necessary to complete a functioning elevator system is the same as that used in our prior patent. In such instances no detailed description of the functioning of that apparatus will be described herein and for ease in cross reference the reference characters have been maintained the same wherever possible. In brief, the same variable voltage motor control system and notching type floor selector employed in our prior patent will be used herein. In addition the same method of registering up and down corridor calls and for registering car calls will be used in addition to the identical stopping and slowdown apparatus. This is no way intended to restrict the use of this invention but merely to simplify the description. The identical method of choosing the next car at the main floor is also employed.

As in our prior patent the three elevator cars will be referred to as the A, B and C cars. Inasmuch as substantial portions of the circuits are identical for all three cars, only those circuits for the A and B cars will be illustrated although components of the C car will also be illustrated where necessary. Components associated only with the A car will be referred to by the basic designation for that component. The identical component associated with the B car will be preceded by the letter B and those of the C car by the letter C. Furthermore, certain components are associated with a particular floor. Where this occurs the reference character will be preceded by a numeral indicating the particular floor with which it is associated. For instance, components associated with the main floor will be preceded by the numeral 1. Components associated with the basement floor level will be preceded by the numeral 0.

It should be noted also that certain components of the system are common to all of the elevator cars. In order to assist in understanding the invention those components associated with each elevator car individually and those which are common to all of the elevator cars are as follows:

APPARATUS FOR ELEVATOR CAR A

AHZ—High zone available car relay
ALZ—Low zone available car relay
AN—Next available car relay
ANN—Non-next available car relay
AV—Available car relay
D—Down switch
DA—Auxiliary door relay
DBH—Down call behind in high zone relay
DBL—Down call behind in low zone relay
DC—Door close relay
DO—Door open relay
DS—Door relay
E—Inductor slow down relay
F—Inductor stopping relay
FD—Down demand assignment relay
FDH—High zone down demand assignment relay
FDL—Low zone down demand assignment relay
FU—Up demand assignment relay
FUH—High zone up demand assignment relay
FUL—Low zone up demand assignment relay
G—Holding relay
HZ—High zone relay
LW—Load weighing switch
M—Running relay
MGS—Motor generator switch
N—Next car relay
ND—Notching relay
PW—Up peak weighing relay
SS—Main floor starting relay
STR—Light beam relay
T—Car call stopping relay TFL—Top floor relay
U—Up switch
UBH—Up call behind in high zone relay
UHL—Up call behind in low zone relay
V—Speed relay
0CR–7CR—Car call registering relays
0FL—Basement relay
0UR–6UR—Up corridor call registering relays
1DR–7DR—Down corridor call registering relays
1FL—Main floor relay
38D—Car call below relay
38R—Car call above relay
42—Auxiliary door control relay
45—Door control relay
70T—Non-interference relay
78DD—Down call ahead relay
78UU—Up call ahead relay
79—Basement assignment relay
80—Second auxiliary running relay
81—Auxiliary running relay
81D—Down preference relay
81U—Up preference relay
87—Main floor assignment relay
438—Stopping relay

APPARATUS COMMON TO ALL CARS

DCH—Down corridor call in high zone relay
DCL—Down corridor call in low zone relay
DDH—Down demand in high zone relay
DDHA—Auxiliary down demand in high zone relay
DDL—Down demand in low zone relay
DDLA—Auxiliary down demand in low zone relay
DDLC—Down demand in low zone cutout relay
HCR—High call return relay
ID—Down peak relay
MAHZ—Master high zone available car relay
MALZ—Master low zone available car relay
MAN—Master next available car relay
MANN—Master non-next available car relay
MFD—Main floor demand relay
MFDA—Auxiliary main floor demand relay
MHU—Master up car in high zone relay
MN—Master next car relay
M79—Master basement assignment relay
M87—Master main floor assignment relay
NDR—No demand return relay
NDS—No demand service relay
PT—Peak traffic timer relay
UCH—Up call in high zone relay
UCL—Up call in low zone relay
UDH—Up demand high zone relay
UDHA—Auxiliary up demand in high zone relay
UDL—Up demand in low zone relay
UDLA—Auxiliary up demand in low zone relay
U1T—First dispatching interval relay
U2T—Second dispatching interval relay
OFD—Basement demand relay
OFDA—Auxiliary basement demand relay.

In order to present the invexntion in an orderly manner the operation of the apparatus will be described as it appears in FIGS. 1 through 10 first. Then several typical operations will be described to illustrate how the components are functionally inter-related.

FIGURE 1

The first figure depicts the motor control circuits for the cars A and B including the starting and stopping circuits. In addition, the activating circuit for the non-interference relay is illustrated. The components associated with the elevator car A are depicted on the left side of the figure while those associated with car B are located on the right side of the figure. Energization for the circuits shown is derived from the direct current busses L1 and L2. As was mentioned above, the variable voltage motor control system of our prior invention has been adopted here for purposes of illustration. Identical reference characters to those employed in FIG. 1 of our prior patent have been used here so that for a detailed understanding of the motor control circuits of our present invention may be had by reference to FIG. 1 of our prior invention. In general it can be said that elevator car A is driven by the direct current motor 14 which is in turn controlled by the generator 16. The direction in which the elevator car will travel is determined by the up and down switches U and D, respectively. The circuits for activating the U and D relays are similar to those in the prior patent. To initially activate either the U or the D relays all the door associated with the car must be closed (contacts DS1 closed) and the secondary running relay 80 must be activated. In addition either the up or the down preference relay must be activated. In the illustrated embodiment of the invention the preference relays are referred to as 81U and 81D rather than W and X as in our prior patent since their operation and function are modified from that of the preference relays in our prior invention. Once activated the up or down switch will remain activated until the stopping inductor relay F is activated as in the prior patent. The holding relay G, inductor slowdown relay E and inductor stopping relay F may all be activated as in our prior patent by the make contacts T1 of the car call stopping relay T. Contrary to the system described in our prior patent all other stopping of the car is initiated by the closing of the contacts 438-1 of the stopping relay 438 the operation of which is described below.

The floor selector 15 is similar to that described in our prior patent. Briefly, it can be said that the floor selector is an electromechanical device located in the penthouse and composed of a carriage carrying numerous sets of electrical brushes which are caused to move in synchronism with the car with which the floor selector is associated to that various control circuits can be completed when the brushes come into contact with fixed contact points on the floor selector corresponding to the floor at which the car is located. The floor selector utilized in this and in our prior system is the notching type, in which the carriage jumps in discrete steps to succeeding floor positions rather than moving in continuous synchronism with the car.

The relay SS is instrumental in dispatching the car designated as the next car from the first or main floor. In order for this relay to be energized, make contacts 1FL1 must be closed to signify that the car A is located at the first floor. If the elevator car A is the next car to be dispatched, if the first dispatching interval has expired, if the non-interference time for the car A has expired and if a car call is registered for the car A for a floor above the first floor, the following energization ciricut is established for the SS relay:

L1, N1, U1T1, 70T1, 38R1, 1FL1, SS, L2

As will be explained below, the contacts U1T1 will close five seconds after the light beam across the doorway which is broken by persons entering the car is reestablished. If persons are entering the car at a rate which never allows the U1T relay to dropout then, alternatively, fifteen seconds after the first up car call is registered, the contacts U2T1 will close to permit dispatching of the car. If the car A is fully loaded, make contacts LW1 of the load switch LW are closed. Under these conditions, the relay SS may be energized regardless of whether or not the make contacts N1 are closed to indicate that the car A is the next car to be dispatched and make contacts U1T1 or U2T1 are closed to signify that the dispatching interval has expired.

Under certain conditions to be described below, the next car may be assigned to respond to corridor calls at floors above the main floor. If the elevator car A has been designated as the next car and has been assigned to up demands, whether in the low zone or the high zone, the start relay SS will be energized through the make contacts N2 of the next car relay and FU1 of the up demand assignment relay. The doors of the elevator car A will close and the car will start up without waiting for the dispatching interval to expire. If the elevator car A is assigned to down demands the SS relay is energized through the make contacts FD1 of the down demand assignment relay which are in parallel with the FU1 contacts.

When the start relay SS picks up, its make contacts SS1 close to establish a holding circuit for the relay through the make contacts 1FL1. Consequently, the relay remains energized until the contacts 1FL1 open to indicate the car A has moved away from the first floor.

As was mentioned above, it is necessary for the second auxiliary running relay 80 to be activated in order to cause the elevator to move. Activation of this second auxiliary running relay is controlled either by a main floor starting relay SS through the make contacts SS2 or the make contacts 81–1 of the auxiliary starting relay 81. As was just discussed, the relay SS controls the dispatching of the next car from the main floor in response to car calls registered by passengers for floors above the main floor, and in response to the assignment of the next car to up or down demands.

The auxiliary running relay 81 is effective to initiate movement of the car A under all other conditions. In order to assure that the main floor starting relay controls dispatching of the next car at the main floor to serve floors above the main floor the break contacts N3 of the next car relay are interposed in series with the contacts 81–1. However, the next car will be started by the 81 relay through make contact 79–1 of the basement assignment relay if the car has been assigned to a basement demand. The operation of the 81 relay will be explained in the discussion of FIG. 10.

The non-interference relay 70T is similar in operation and function to the similarly identified relay in FIG. 1 of our prior patent. As there, the relay is provided with a suitable delay in dropout sufficient to permit discharge of passengers from the elevator car A or entry of passengers into the elevator car A after each stop.

FIGURE 2

This figure depicts the corridor call registering and cancelling circuits in addition to circuits for the stopping relay 438. The circuits associated with the up corridor calls are located in the upper half of the figure while those associated with down corridor calls are located in the lower half of the figure. The apparatus for registering the corridor calls is similar to that employed in our prior patent. For instance when the up call button at the second floor 2U is depressed by a prospective passenger, the relay 2UR is activated and is held in by its make contacts 2UR1. When a car answers the registered up call at the second floor, the canceling coil 2URN is activated to cancel the call registration. Registering and cancelling of down corridor calls is accomplished similarly. Each up corridor call registering circuit is associated with a contact on the floor selector in the $a$ row, while each up corridor call cancelling circuit is connected to a contact on the selector in the $b$ row. Similarly the down corridor call registering circuits are associated with a contact on the floor selector in the $c$ row, while the down corridor call canceling circuits are associated with a contact on the floor selector in the $d$ row. As an elevator car notches into a particular floor the appropriate brushes come into contact with the associated set of contacts for that floor. For example, as the elevator car A notches into the second floor the brushes $aa$ come into contact with the contact $a2$.

Figure 2:
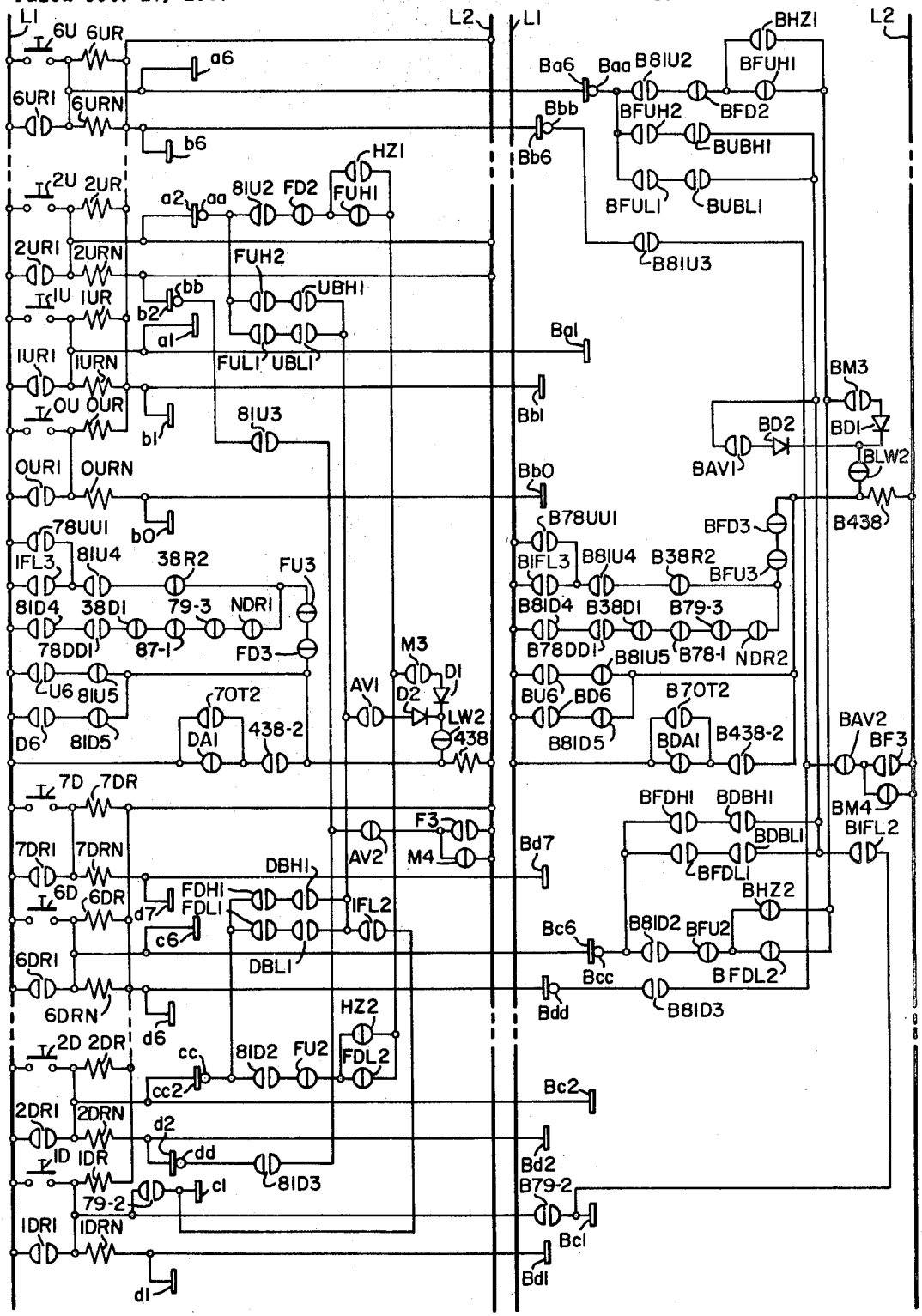
FIGS. 2 through 10 are schematic views with circuits shown in straight line form of further portions of the elevator control system illustrated in FIG. 1.

In order for a car traveling through the hatchway to stop in response to a registered corridor call, the 438 relay must be activated. However, in order for the 438 relay to be activated in response to a corridor call, the break contacts LW2 of the load weighing switch must be closed indicating that the car is not already loaded to capacity. Ordinarily, in order for a car traveling up (contacts 81U2 the up preference relay closed) to stop in response to an up corridor call, it must not be traveling up on assignment to answer down corridor calls (break contacts FD2 closed). Furthermore, it will not stop for an up corridor call in the low zone (make contacts HZ1 of the high zone relay open) if it has been assigned to answer up calls in the high zone (break contacts FUH1 open). By way of example, consider that the elevator car A has just notched into the second floor as shown in FIG. 2, that it is traveling in the up direction, and that it is not assigned to down demands nor to up demands in the high zone. Activation of the stopping relay 438 in response to an up call at the second floor occurs through the following circuit:

L1, 2UR1, $a2$, $aa$, 81U2, FD2, FUH1, M3, D1, LW2, 438, L2

The 438 relay will remain activated through its holding contacts 438–2 and the make contacts 70T2 of the non-interference relay, which, it will be remembered, remains picked up after the running relay M has dropped out. As the car approaches the level of the second floor, the up corridor call for the second floor will be cancelled through the following circuit when the inductor stopping relay F is activated:

L1, 2UR1, 2URN, $b2$, $bb$, 81U3, AV2, F3, L2

The break contacts AV2 of the available car relay are inserted in the circuit to ensure that an available car stopped at a floor at which an up call is registered will not cancel that call unless it is assigned to the call.

In a similar manner down corridor calls will be answered by a car traveling in the down direction (make contacts 81D2 and M3 closed) if it is not already loaded to capacity (contacts LW2 are closed) and it is not assigned to answer up demands (make contacts FU2 closed). However, such a car will not stop for a down corridor call in the high zone (break contacts HZ2 open) if the car has been assigned to answer down calls in the low zone (contacts FDL2 open). A down corridor call registered at the second floor will energize the stopping relay 438, of the elevator car A through the following circuit as the car notches into the second floor as shown in FIG. 2 if it is traveling in the down direction, is not assigned to up calls and is not already loaded to capacity:

L1, 2DR1, $c2$, $cc$, 81D2, FU2, FDL2, M3, D1, 438, L2

As the car approaches the second floor and the inductor stopping relay F is energized the down corridor call will be cancelled through the following circuit:

L1, 2DR1, 2DRN, $d2$, $dd$, 81D3, AV2, F3, L2

Activation of the stopping relay 438 is also utilized to open the doors of a car standing at a floor to which it has been assigned for answering corridor calls. For instance, if the elevator car A, which is shown in FIG. 2 at the second floor, is available for service (make contacts AV1 closed) its doors will necessarily be closed as will be seen from later discussion. If the car has been assigned to answer up demands in the low zone (make contacts FUL1 closed) and there are no up demands in the low zone below the floor at which the car is situated (UBL1 contacts closed), then if there is an up call registered at the second floor (make contacts 2UR1 closed) the car must necessarily be located at the lowest up call in the low zone and the following circuit will be completed to activate the 438 relay and therefore initiate door opening to admit the passengers:

L1, 2UR1, $a2$, $aa$, FUL1, UBL1, AV1, D2, LW2, 438, L2

Since a car will lose its availability designation when it is assigned to a demand, the make contacts AV1 are provided with a slight time delay to ensure energization of the 438 relay. Since the car A is now assigned to answer up demands, make contacts 81U3 of the up preference relay will be closed. Since the car is not yet running (break contacts M4 closed) the up floor corridor call to the second floor will be cancelled through the following circuit when the car loses its availability designation:

L1, 2UR1, 2URN, b2, bb, 81U3, AV2, M4, L2

In a similar manner if the elevator car A becomes available at the sixth floor (make contacts AV1 closed), if there is an up corridor call registered at the sixth floor (make contacts 6UR1 closed) and this was the lowest up call registered in the high zone (make contacts UBH1 closed) then when the car A is assigned to answer that demand (make contacts FUH2 closed) the relay 438 would be energized through the following circuit:

L1, 6UR1, a6, aa, FUH2, UBH1, AV1, D2, LW2, 438, L2

Again the corridor call at the sixth floor would be cancelled when the car A lost its availability designation in the same manner as described above.

Down corridor calls are answered in an essentially similar manner. Stopping relay 438 will be energized in response to down corridor calls when a car which is traveling in the down direction (make contacts 81D2 and M3 closed) as the car notches into a floor at which a down call is registered, if the car is not already loaded to capacity (contacts LW2 closed) and it is not assigned to answer up demands (break contacts FU2 closed). There is one limitation on this. If a car is traveling down in the high zone (break contacts HZ2 open) and is assigned to answer down demands in the low zone (make contacts FDL2 open) then the car will not stop for down corridor calls until it reaches the low zone (break contacts HZ2 closed). For example if the elevator car A is assigned to answer down demands in the low zone and a down corridor call is registered at the second floor (make contacts 2DR1 closed), the 438 relay is activated as the car A notches into the second floor through the following circuit:

L1, 2DR1, c2, cc, 81D2, FU2, HZ2, M3, D1, LW2, 438, L2

The corridor call at the second floor would be cancelled when the inductor stopping relay picked up make contacts F3 closed through the following circuit:

L1, 2DR1, 2DRN, d2, dd, 81D3, AV2, F3, L2

As was discussed above, if an available car is assigned to answer up corridor calls and it is standing at the lowest up call in the zone to which it is assigned, the 438 relay will be energized. Similarly, an available car may pick up its 438 relay to initiate door opening if it is located at the highest floor at which a down corridor call is registered in the zone to which it is assigned to answer down calls. By way of example if elevator car A is located at the second floor (brush cc in contact with segment c2), is assigned to answer down calls in the low zone (make contacts FDL1 closed) and there are no down calls above the second floor in the low zone (contact DBL1 closed) but there is a down call at the second floor (make contact 2DR1 closed) and elevator car A is available AV1 closed, the 438 relay will be energized through the following circuit:

L1, 2DR1, c2, cc, FDL1, DBL1, AV1, D2, LW2, 438, L2

If the elevator car A had been assigned to answer down demands in the high zone and it was standing at the floor at which the highest down demand was registered, the 438 relay would have been energized through the make contacts FDH1 and DBH1 rather than FDL1 and DBL1.

When an avilable car at the main floor is selected to answer the down call at the main floor, the basement assignment relay 79 is energized and the 438 relay is picked up through the following circuit:

L1, 1DR1, 79-2, 1FL2, AV1, D2, LW2, 438, L2

The 438 relay is energized under these conditions in order to initiate door opening to permit entrance of the passenger since only the car designated as the next car has its door open when available. As will be seen later, the non-next available car is selected in preference to the next car to answer a down corridor call at the first floor and therefore it is necessary to open the door.

Once activated the 438 relay remains energized through its make contacts 438-2 as long as the car door is open (break contacts DA1 closed) or as long as the non-interference time has not elapsed (make contacts 70T2 closed).

As will be explained below, a car which completes a trip in the basement and has no further duties to perform will be returned to the main floor. Once upward movement of the car from the basement is initiated as discussed below, means must be provided for stopping the car at the main floor. Such means should not stop a car traveling up from the basement, however, if a passenger has registered a car call for a floor above the main floor (relay 38R energized) or if the car is assigned to answer up or down demands (either relay FU or FD energized). Consequently, the stopping relay of the elevator car A will be energized through the following circuit as the floor selector notches into the first floor position traveling in the up direction only if there are no car calls registered for floors above the first floor, and the car is not assigned to up or down demands:

L1, FL3, 81U4, 38R2, FU3, FD3, 438, L2

Sometimes a call for which a car is traveling is cancelled by another car. Under such circumstances it is desirable to stop the car at the next floor so that it can become available to serve other calls. Therefore, if a car traveling up above the first floor no longer has anywhere to go since no corridor calls for floors above the position of the car are registered (contacts 38R2 closed), it is not assigned to any demands for service (break contacts FU3 and FD3 closed) and it can see no up corridor calls above (contacts 78UU1 closed—see FIG. 5), its stopping relay will be energized through the following circuit:

L1, 78UU1, 81U4, 38R2, FU3, FD3, 438, L2

It is equally desirable to stop a car traveling downward at the next floor it comes to when it no longer has a specific duty to perform. In addition to not having any car calls registered for floors below the position of the car (break contacts 38D1 closed), not seeing any down corridor calls below (make contacts 78DD1 closed) and not being assigned to up or down demands (break contacts FU3 and FD3), a car traveling in the down direction must not be assigned to the main floor or the basement (break contacts 87-1 and 79-3 closed). If all of these conditions are met and the system is not operating on up peak (break contacts NDR1 closed), the 438 relay will be energized through the following circuit:

L1, 81D4, 78DD1, 38D1, 87-1, 79-3, NDR1, FU3, FD3, 438, L2

At times it is necessary to stop the car A in response to corridor calls for service in the opposite direction from that in which the car is traveling. This could occur for instance where the car is assigned to down demands in the high zone but the car is located below the highest down demand in that zone. Under these circumstances it is necessary for the car to travel up in order to answer the down demands. While the car is traveling up the make contacts U6 of the up switch will be closed and the up preference relay 81U will be activated. As will be explained below, when the elevator car A notches into the highest floor in the high zone at which a down corridor call is registered, the 1U relay will drop out and 438 will be picked up through the following circuit:

L1, U6, 81U5, 438, L2

This same sequence would occur any time that a car traveling in the up direction notches into a floor at which it is to reverse directions. Similarly a car traveling in a down direction (D6 closed) will activate the 438 relay when make contacts 81D5 close as the elevator car A notches into the floor at which it is to reverse directions.

FIGURE 3

Figure 3:
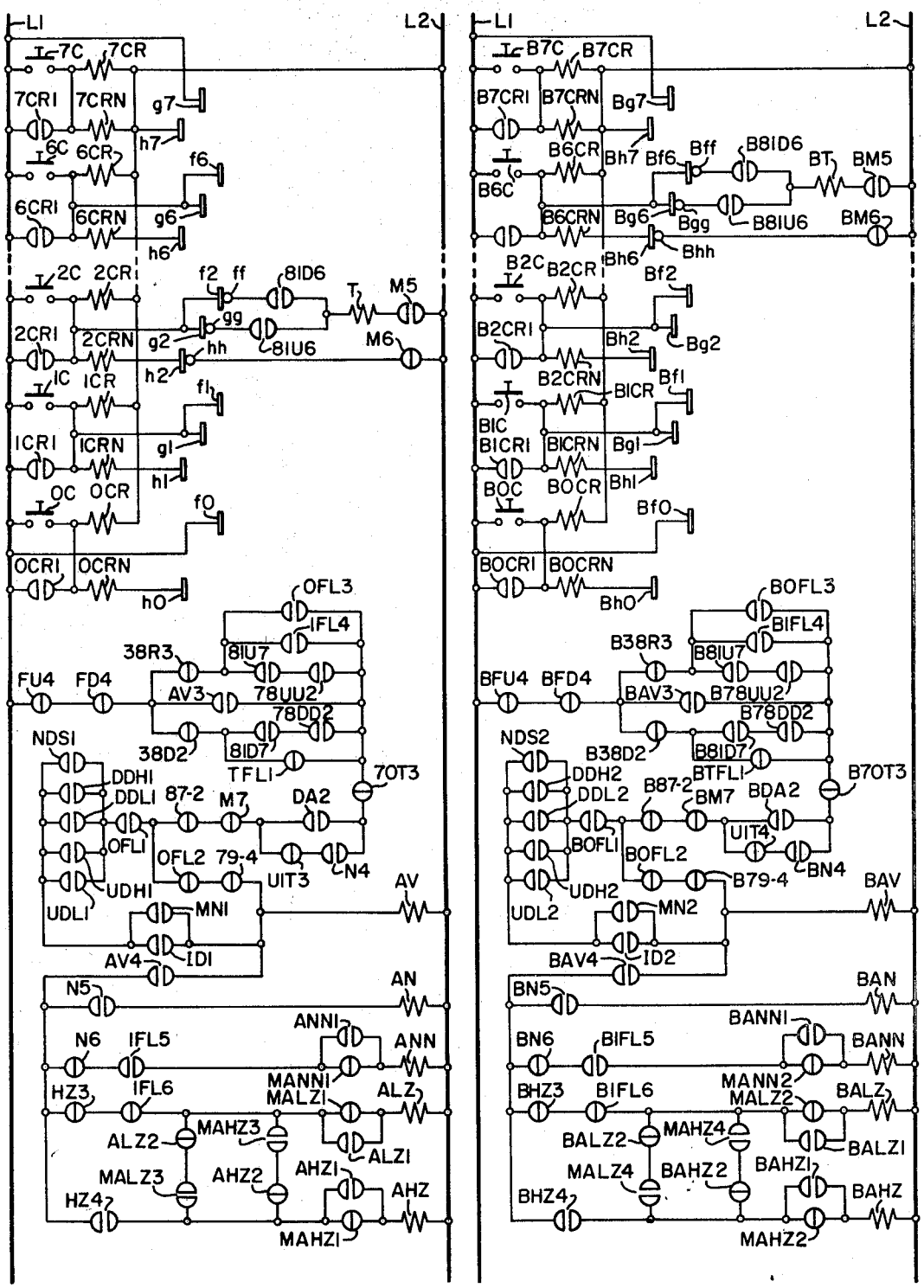

FIG. 3 depicts the car call registering and cancelling circuits in addition to the available car relays. The car call registering and cancelling circuits illustrated are identical in operation and function to those described in FIG. 3 of our prior patent and it should be remembered from the discussion above that the up preference relay 81U corresponds to the W relay in our prior patent and likewise that the down preference relay 81D corresponds to the relay X in our prior patent. Preference should be made to our prior patent for a detailed description of the operation of these circuits.

Energization of the relay AV indicates that the car A is available for service. A car can become available at the floor at which it completes a trip, if its non-interference time has expired and its doors are closed. Since it is posited that the A car has completed a trip, it will not be assigned to up demands in either the high or the low zone and therefore break contacts FU4 will be closed. It will also not be assigned to down demands in either the high zone or the low zone and therefore break contacts FD4 will also be closed. If the non-interference time has expired the break contacts 70T3 will be closed and if the doors are within a few inches of fully closed position the make contact DA2 will be closed. In addition, in order to become available the elevator car A must not be assigned to the main floor (break contacts 87-2 closed) nor to the basement (break contacts 79-4 closed). If the car is not at the basement, make contacts 0FL1 are open and break contacts 0FL2 are closed. Further prerequisties to be discussed below must be present before the car can become available in the basement. Of course if the car has completed a trip it will be standing at a floor and therefore break contacts M7 of the running relay will be closed. Furthermore, the elevator car A has completed a trip at an intermediate floor, that is a floor other than a main floor, basement or the top floor, only if there are no further car calls ahead of the car and no further corridor calls ahead of the car which the car is in a position to answer. By calls ahead of the car it is meant for instance that a car traveling in the up direction (make contacts 81U7 closed) must not have any car calls registered for floors above the floor at which the car is located (break contacts 38R3 closed) and there must be no up corridor calls registered for floors above the floor at which the car is located which the car is in a position to answer (make contacts 78UU2 closed). The conditions which determine that a car is in position to answer corridor calls ahead will be discussed later.

By way of example, the relay AV of the A elevator car will be energized through the following circuit if the A car after traveling in the up direction is stopped at the second floor as shown in FIG. 2, there are no calls registered in the A car for floors above the second floor and there are no up corridor calls registered at floors above the second floor, the non-interference time has expired and the doors are closed:

L1, FU4, FD4, 38R3, 81U7, 78UU2, 70T3, DA2, M7, 87-2, 0FL2, 79-4, AV, L2

Since as will be seen below, the 81U relay drops out when a car becomes available, energization of the AV relay is maintained through the make contacts AV3. Alternatively, if the elevator car has been traveling down (make contacts 81D7 closed) energization of the AV relay can be established through a parallel branch of the circuit if no down car calls are registered below the car (break contacts 38D2 closed) and there are no down corridor calls registered for service below the car (make contacts 78DD2 closed). At the top floor (break contacts TFL1 closed, the car becomes available if there are no car calls registered for flors below the top floor (break contacts 38D2 closed).

A special situation exists for a car which comes to rest at the first floor. For a car at the first floor (make contacts 1FL4 closed) it does not matter from which direction the car arrived at that floor. The trip will be considered complete unless there are car calls registered for floors above the first floor (break contacts 38R3 open) or unless it is assigned to serve the basement level (break contacts 79-3 open). Although ordinarily the doors of the car must be closed for the car to become available (make contact DA2 closed), the next car to be dispatched from the first floor (make contacts N4 closed) may become available even though it is standing with its doors open if the first dispatching interval has expired (break contacts U1T3 closed).

In order for a car standing at the basement (make contacts 0FL3 closed) to become available, the requirement that a trip be completed is fulfilled if there are no car calls registered for floors above the basement (break contacts 38R3 closed). In addition to the other conditions which must be satisfied by cars at the main floor, there are the further requirements that there be a demand for service and that there be a car designated as the next car located at the first floor. In terms of the circuits of FIG. 3 this means that with the car in the basement, make contacts 0FL1 closed and break contacts 0FL2 open, at least one of the sets of contacts DDH1, DDL1, UDH1 or UDL1 must be closed to indicate a demand for service in the down direction in the high or low zone or in the up direction in the high or low zone respectively and the contacts MN1 of the master next car relay must be closed. However, if the system is operating under down peak condition (make contact ID1 closed) it is not necessary that there be a next car at the first floor. Furthermore in addition to the normal demands for service, the car can become available in the basement if there is an artificial demand for service (make contacts NDS1 closed) during down peak operation. The function of the no demand service relay will be explained below.

To summarize by way of example, the elevator car A can become available at the basement if there are no car calls registered, if its interference time has expired, if its doors are closed, if there is a demand for service and there is a next car at the first floor. Considering the case where there is a down demand in the low zone registered, energization of the available car relay occurs through the following circuit:

L1, FU4, FD4, 38R3, 0FL3, 70T3, DA2, M7, 87-2, 0FL1, DDL1, MN1, AV, L2

In addition to being designated as an available car, a car may receive further special designations such as next available car, non-next available car, available low zone car and available high zone car. The car at the first floor which is designted as the next car (make contacts N5 closed) will be designated as the available next car (relay AN energized) if it also meets all the requirements for being designated as available (make contacts AV4 will then be closed). The car at the first floor (make contacts 1FL5 closed) which is not designated as the next car (break contacts N6 closed) may be designated as the non-next available car (relay ANN energized) if no other car has already been designated as the non-next available car (break contacts MANN1 of the master non-next available car relay closed). Once the car A is selected as a non-next available car energization of the relay ANN is maintained through the holding contacts ANN1.

An available car may be designated as the low zone available car (relay ALZ energized), if it is not in the high zone (break contacts HZ3 closed), is not at the first floor (break contacts 1FL6 closed) and no other car has already been designated as the low zone available car (break contacts MALZ1 closed). Once picked up the relay ALZ will remain energized through the holding contacts ALZ1. Similarly, i.e. an available car may be designated as the high zone available car (relay AHZ energized), if the car is located in the high zone (make contacts HZ4 closed) and no other car has already been assigned to the high zone (break contacts MAHZ1 closed). Once picked up the AHZ relay will remain energized through its holding contacts AHZ1.

The circuits between the ALZ and AHZ relays become effective when two cars become available in the same zone. For example, if the elevator car A becomes available in the low zone but another car has already been designated as the low zone available car the contacts MALZ1 of the master low zone available car relay will be open. The A car therefore cannot be designated as the low zone available car. However, since the relay ALZ cannot be picked up the break contacts ALZ2 will be closed, and since the make contacts MALZ3 of the master low zone available car relay are closed, the elevator A may be designated as the high zone available car through the following circuit if no other car has already been designated as the high zone available car (break contacts MAHZ1 closed):

AV energizing circuit, AV4, HZ3, 1FL6, ALZ2, MALZ3, MAHZ1, AHZ, L2

Once the AHZ relay is energized it will be maintained in that condition through the holding contacts AHZ1.

In like manner, the second car to become available in the high zone may be designated the low zone available car if no other car is already designated the low zone available car through the following circuit:

AV energizing circuit, AV4, HZ4, AHZ2, MAHZ3, MALZ1, ALZ, L2

If the elevator car A becomes available in the low zone but is designated as the high zone available car because another car has already been assigned as the low zone available car, the elevator car A will be redesignated as the low zone available car if the other car is subsequently given an assignment. This occurs because when the other car loses its designation as the low zone available car the break contacts MALZ1 of the master low zone available car close thus completing the circuit for the relay ALZ designating the elevator car A as the low zone available car. Deenergization of the master low zone available relay causes elevator car A to lose its designation as the high zone available car because the breaks contacts MALZ3 open. Even though contacts MALZ3 will reclose after the A car is designated as the low zone available car the break contacts ALZ2 will then be open to prevent reestablishment of the energizing circuit for the AHZ relay. A similar change of designation will occur when the second car to become available in the high zone is designated as the low zone available car and the previously designated high zone available car is then given an assignment. However under these conditions the last car to remain in the high zone will be designated the high zone available car.

When all three cars become available at the first floor the third car will not have any special designation and will be an idle car. For instance if the third car is the A car, it cannot become the next available car since contacts N5 will be open, it cannot become the non-next available car since contacts MANN1 will be open, it cannot become the low zone available car since contacts 1FL6 will be open and it cannot become the high zone available car since contacts HZ4 are open. The third car will become the next available car or the non-next available car when one of the other cars loses its special designation.

FIGURE 4

This figure depicts first circuits for classifying corridor calls according to the direction in which service is desired and the zone in which the calls originated. The components performing these functions are common to all the cars and appear in a vertical column above the bracket at the bottom of the figure labelled "Common." FIG. 4 also illustrates the circuits individual to each car which indicate whether there are up or down calls behind the particular car in either the high or the low zone. Those components associated with the car A appear above the bracket marked "Car A" and those associated with car B appear above the bracket marked "Car B."

The relay UCH indicates that there is an up corridor call registered in the high zone if it is deenergized. In other words, the up call in the high zone relay is energized if there are no up calls registered in the high zone (break contacts 6UR2 and 6UR2 closed). However, if up calls are registered at either the fifth or sixth floor (there can be no up call registered at the seventh, the top floor) the circuit will be broken and UCH will be deenergized. Similarly the up call in the low zone relay UCL is energized unless there is an up call registered in the low zone, that is, unless at least one of the break contacts 2UR2, 3UR2, or 4UR2 is open.

In a similar manner the down call in the high zone relay DCH will be energized unless there is a down call registered in the high zone (at least one of the break contacts 7DR2, 6DR2 or 5DR2 is open). Registration of a down corridor call in in the low zone will deactivate the down call in the low zone relay DCL through the opening of at least one of the break contacts 4DR2, 3DR2 or 2DR2.

The up call behind in the low zone relay UBL will be activated when the elevator car A is in the low zone unless there is an up call registered in the low zone below the floor at which the car is located. In order to accomplish this, a row of contacts on the floor selector, contacts $k2$ through $k4$ associated with the second through fourth floors respectively, cooperates with the brush $kk$ on the floor selector carriage to complete a circuit for energization of the UBL relay if the break contacts of the corridor call registering relays for the floors below the car are closed. For example, in FIG. 4 the elevator car A is shown at the second floor position. The brush $kk$ is therefore in contact with the contact segment $k2$. Since the elevator car A is located at the lowest floor in the low zone, there can be no up corridor calls behind in the low zone and therefore the relay UBL is energized through the direct circuit as follows:

L1, $k2$, $kk$, D6, UBL, L2

Consider now that an up call is registered at the second floor which goes unanswered (break contacts 2UR2 open). The relay UBL will be energized through the circuit just described. This in turn will close the make contacts UBL2. The contacts ND2 of the notching relay, the operation of which is explained later, will be open, however. If the elevator car A then moves away from the second floor in the upward direction, as the floor selector notches the break contacts ND2 will be closed and energization of the UBL contact relay will be maintained during notching. As the selector notches into the third floor position, however, the contact ND2 will again open. Since there is an up call registered at the second floor (break contacts 2UR2 open), the UBL relay will be deenergized thereby indicating that an up call is registered in the low zone behind the A car. The up call behind relay operates independent of the direction in which the car is traveling. It should also be noted that the relay UBL is deenergized when the elevator car A is in the high zone since there are no contacts in the $k$ row associated with the floors which are in the high zone. This will not falsely indicate that there is an up call behind in a low zone however because the circuits in which contacts of this relay are employed are not active when the car A is in the high zone. It should be further noted that there is a contact in the k row at the main floor, k1, so that the relay UBL will be activated whenever the car is at the first floor. The blocking diode D6 is included in the circuit to prevent energization of the relay UCL when the elevator car A first notches into a floor above the floor for which an up corridor call is registered before the relay UBL is deactivated.

When a car is in the high zone, the up call behind in the high zone relay UBH will be activated unless there is an up corridor call registered in the high zone for a floor below the floor at which the car is located. The contacts j5 and j6, located on the floor selector and associated with the fifth and sixth floors respectively, cooperate with the brush jj on the floor selector carriage to complete a circuit for energization of the relay UBH if the break contacts of the corridor call registering relays for floors in the high zone below that at which the car is located are closed. For the elevator car B shown in FIG. 4 at the sixth floor, the up call behind in a high zone relay BUBH will be activated unless there is an up call registered at the fifth floor (break contacts 5UR2 open). Again, contacts of the notching relay BND2 are inserted in the holding circuit to maintain energization of the relay BUBH as the car notches between floors. Since there are no contacts on the floor selector for floors below the high zone, the relay BUBH will not be activated when the car is not in the high zone, however, a false indication of an up call behind in the high zone will have no effect on the system since circuits associated with this relay are only effective when the car is in the high zone. The blocking diode BD5 performs a function similar to that performed by D6, but prevents inadvertent energization of relay UCH.

The down call behind in the low zone relay DBL is activated when the car A is in the low zone unless there is a down corridor call registered in the low zone at a floor above the floor at which the car is located. A row of contacts m2 through m4 cooperate with brush mm in a manner similar to that of the contacts and brush associated with the relay UBL except that there is no contact for the first floor. To illustrate the operation of this relay, if the elevator car A is at the second floor as shown in FIG. 2, the relay DBL will be energized through the following circuit if there are no down calls at the third or fourth floor:

L1, 4DR2, 3DR2, m2, mm, D8, DBL, L2

If a down corridor call were registered at the third or fourth floor (break contacts 3DR2 or 4DR2 open), the relay DBL would be deenergized thus indicating a down corridor call above the elevator car A in a low zone. Notice that a down call registered at the second floor (break contacts 2DR2 open) would not effect the relay DBL since a corridor call at that floor could not be above a car in the low zone. Again energization of the relay DBL is maintained during notching by the contacts ND4 and the holding contacts DBL2. Deenergization of the relay DBL when the car A is not located in the low zone has no effect on the system for the same reason that deenergization of the UBL relay has no effect on the system when the car is not in the low zone. The blocking diode D8 prevents false energization of the relay DCL.

Figure 4:
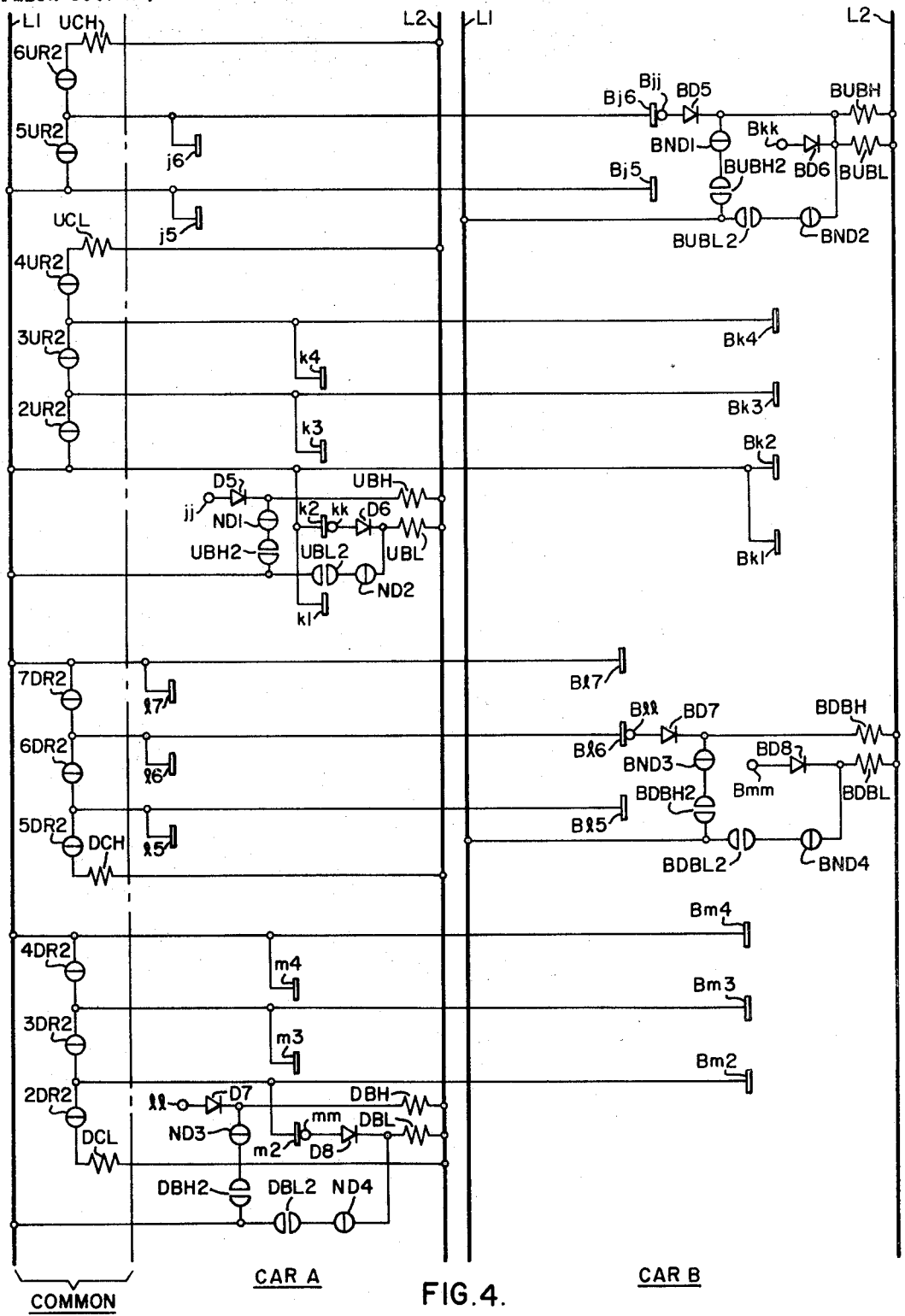

For the circuits associated with the down corridor call behind in the high zone relay, reference should be made to the circuits associated with the B car which is shown in FIG. 4 as being located at the sixth floor. Energization of the relay BDBH is controlled by the row of contacts Bl5 through Bl7 and the brush Bll. If the car is located in the high zone and there are no down calls registered for floors above the floor at which the car is located, the down call behind in the high zone relay will be energized. For the circuits of FIG. 4, if there is no down call registered at the seventh floor, the relay BDBH will be energized through the following circuit:

L1, 7DR2, Bl6, Bll, BD7, BDBH, L2

Energization of the BDBH relay is also maintained during notching through the contacts BND3 and BDBH2. It is also of no consequence that the relay BDBH is not energized when the B car is not located in the high zone. The blocking diode BD7 performs a function similar to that of diode D8.

FIGURE 5

Figure 5:
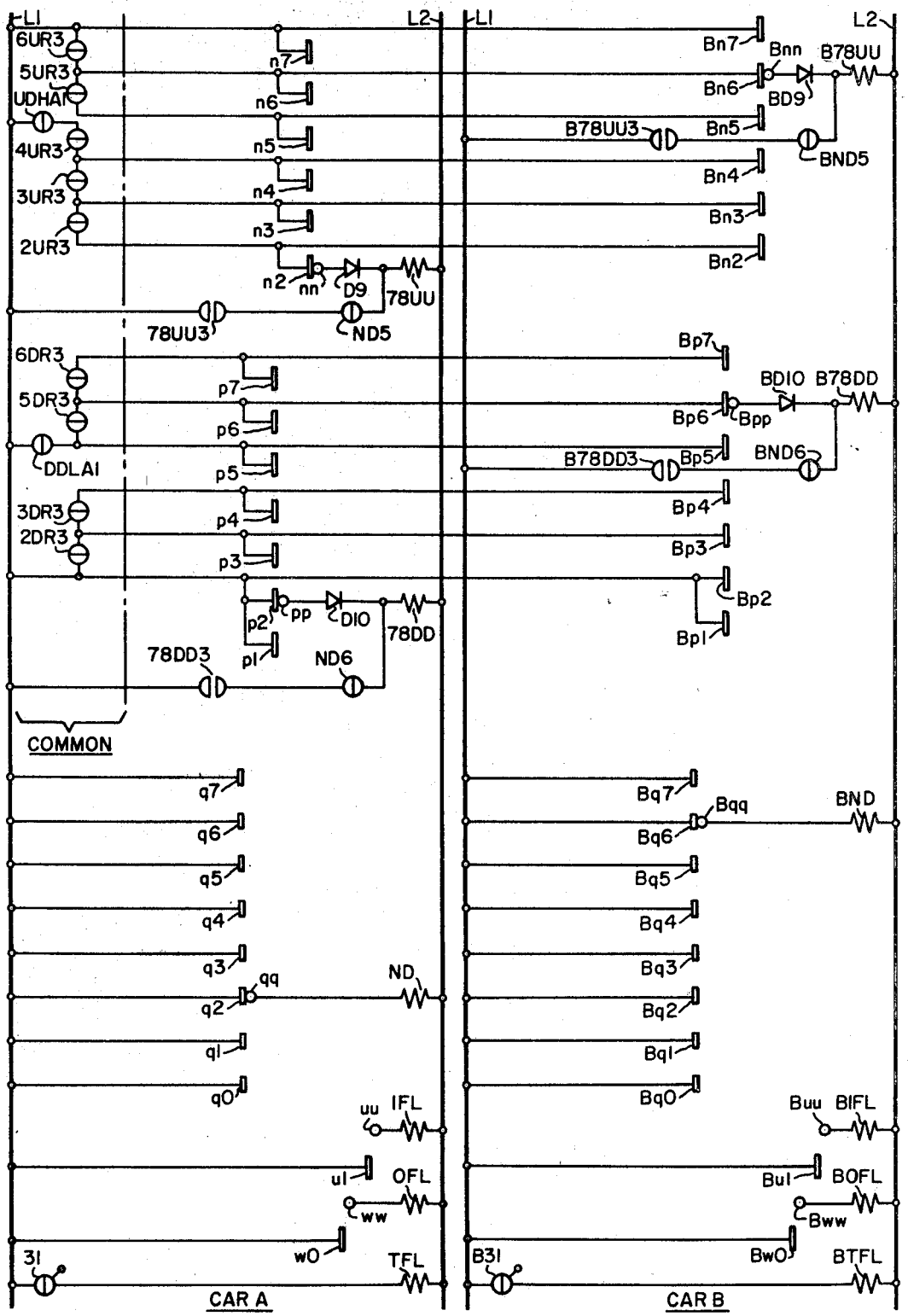

FIG. 5 illustrates the up call ahead and down call ahead circuits in addition to the circuits for the notching relay and the relays which indicate that the car is either at the main floor, the basement or the top floor.

Those components associated with the up call ahead and down call ahead circuits appearing in FIG. 4 in the column above the bracket labeled "Common" are common to all cars in the system. Those up and down call ahead circuit components associated only with elevator car A appear in FIG. 5 in the column directly above the bracket marked "Car A." The components associated with car B are similarly identified.

Energization of the up call ahead relay 78UU is controlled by a row of contacts n2 through n7 on the floor selector, associated with the second through seventh floors respectively, which are engaged successively by a brush nn on the carriage of the floor selector as it notches from floor to floor.

Ordinarily, the relay 78UU of a car above the main floor will be energized unless there is an up corridor call registered at the floor at which the car is located or at a higher floor in the same zone. Consider the elevator car A in FIG. 5 which is shown at the second floor. As long as there are no up corridor calls registered in the low zone, and as long as no up demand in the high zone has been given preference (relay UDHA deenergized), the relay 78UU will be energized through the following circuit:

L1, UDHA1, 4UR3, 3UR3, 2UR3, n2, nn, D9, 78UU, L2

If on the other hand, an up corridor call is registered in the low zone the corresponding break contact 2UR3, 3UR3, or 4UR3, is open and the relay 78UU is deenergized. As with the call behind circuits, energization of the relay 78UU is maintained during notching through holding contacts 78UU3 and the break contacts ND5 of the notching relay. Similarly, when a car is in the high zone its up call ahead relay is picked up unless there is an up call above. Considering the elevator B which is shown in FIG. 5 at the sixth floor, if there is no up call registered at the sixth floor (break contacts 6UR3 closed) then the up call ahead relay B78UU for the B car will be energized through the following circuit:

L1, 6UR3, Bn6, Bnn, BD9, B78UU, L2

For a car located in the low zone, the up call ahead relay will also be deenergized when an up corridor call is registered in the high zone if an up demand for service in the high zone has been created which has been given first preference (break contacts UDHA1 open). Under these conditions the elevator car A at the second floor would have its up call ahead relay 78UU deenergized if there is an upper corridor call registered at any floor 2 through 6. The fact that the relay 78UU would also be deactivated when the elevator car was at the main floor or the basement, since there are no contacts in the n row at these floors, has no effect on the circuits in which contacts of the 78UU relay are utilized.

The down call ahead circuits operate in a similar manner except that the relay 78DD is activated through contacts in the p row and brush pp unless there is a down call registered at a lower floor in the zone in which the car is located. For instance if the elevator car A was located at the fourth floor the relay 78DD would be activated through the following circuit if there are no down calls below in the low zones:

L1, 2DR3, 3DR3, $p4$, $pp$, D10, 78DD, L2

If, however, there is a down call registered at the second or third floor (break contact 2DR3 or 3DR3 open), relay 78DD is deenergized thus indicating that there is a down corridor call at a floor below the elevator car A. Again energization of relay 78DD is maintained during notching of the holding contacts 78DD3 and the break contacts ND6 of the notching relay. For an elevator car located in the high zone such as the B car in FIG. 5 energization of the down call ahead relay would ordinarily be through a path such as the following as long as no down demand in the low zone is given preference (relay DDLA deenergized):

L1, DDLA1, 5DR3, B$p6$, B$pp$, BD10, B78DD, L2

Under these circumstances only a down corridor call at the fifth floor (break contacts 5DR3 open) would deenergize the down call ahead relay. Ordinarily a car in the high zone does not "see" down corridor calls registered in the low zone because a circuit for the energization of the relay 78DD is established through the break contacts DDLA1 of the axially down demand in the low zone relay. However, when down corridor calls in the low zone create a demand for service and that demand is given preference, the relay DDLA is energized opening its contacts DDLA1 to prevent energization of the 78DD relay. Since a down corridor call must be registered in the low zone in order for contacts DDLA1 to be open, the car in the high zone will "see" the down corridor call in the low zone under these circumstances. It should be noted that there is a contact in the $p$ row at the first floor, but there is none for the basement level. Again deenergization of the 78DD relay of a car in the basement has no operative effect on the system. The blocking diodes D9 and D10 are provided to prevent feedback during notching.

The circuits for the notching, main floor, basement level and top floor relays associated with the elevator car A are shown in the lower half of FIG. 5 above the bracket labeled "Car A." The identical circuits for the elevator car B are shown in the lower right side of the figure above the bracket labeled "Car B."

Figure 6:
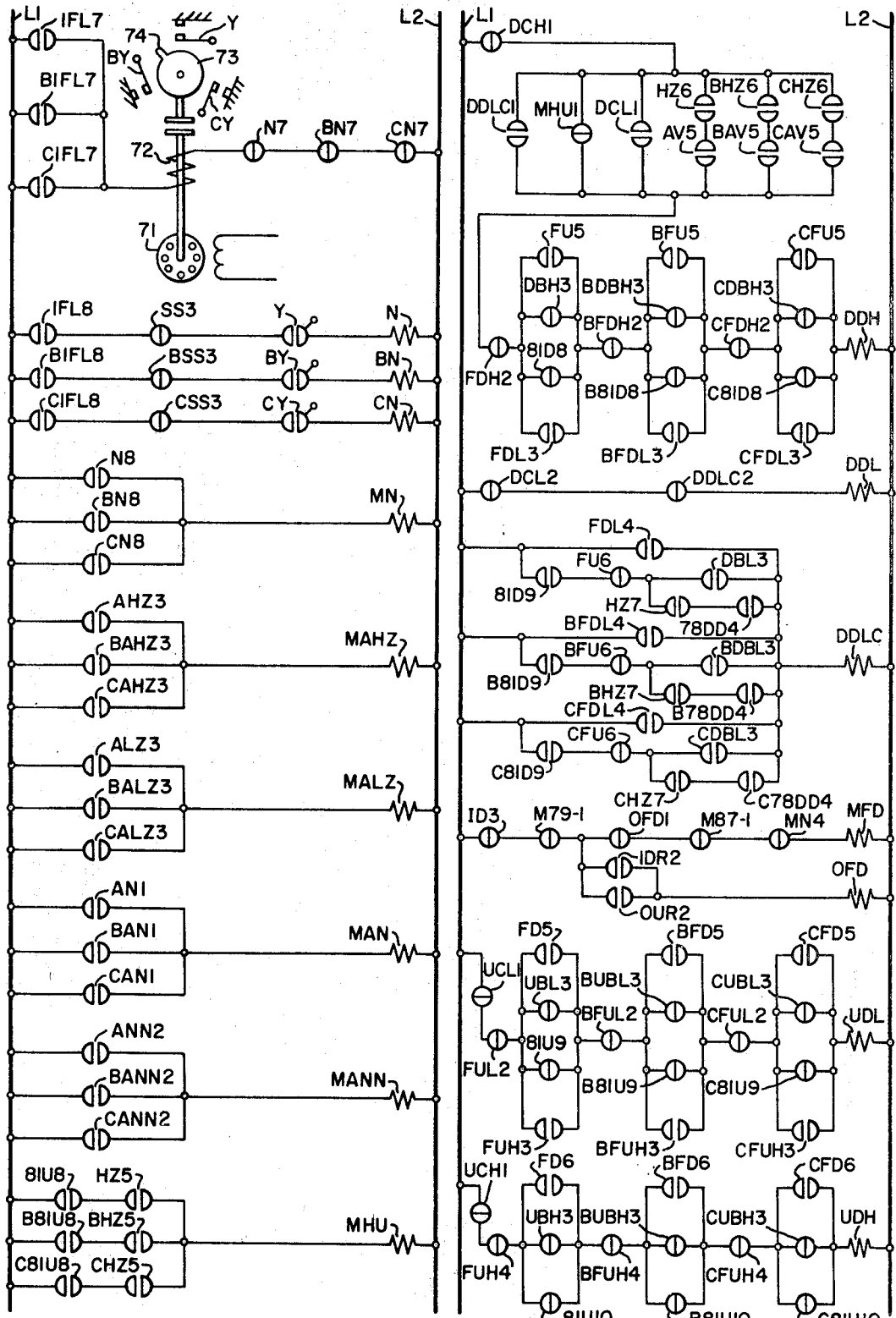

As has been noted heretofore, contacts of the notching relay ND are employed to prevent the loss of certain indications during notching of the carriage of the floor selector for the elevator car A. Associated with the notching relay is a row of contact segments $q0$ through $q7$ which are engaged successively by a brush $qq$ as the carriage of the floor selector for elevator car A notches from its basement to seventh-floor position, respectively. The operation and function of the circuit for the notching relay ND is essentially the same as that employed in our prior patent. Reference should be made to FIG. 6 of that patent for a detailed description of the operation of this circuit.

The relays 1FL and 0FL indicate that the elevator car A is located at the first floor and basement respectivevly. When the floor selector notches into the first floor position the brush on the floor selector carriage $uu$ comes into contact with the segment $u1$ thus completing the circuit energization of the relay 1FL. Similarly when the car notches into the basement position the brush $ww$ comes in contact with the segment $w0$ thus providing energization for the relay 0FL.

The relay TFL is energized any time that the elevator car A is not physically located at the top floor. However, when the car actually arrives adjacent the top floor a mechanical switch 31 is opened thereby deactivating the relay TFL.

FIGURE 6

FIG. 6 illustrates the circuits for selecting the next car, the circuits for several of the master relays including master next car relay, master available high zone relay, master available low zone relay, master available next car relay, master available non-next car relay, and the master up car in a high zone relay and the circuits for registering demands for service.

The mechanism utilized to select the car at the first floor to be designated as the next car is identical to that employed in our prior patent. For a complete understanding of the electromechanical mechanism reference should be made to FIG. 7 of our prior patent. Briefly, it may be said that the first car to notch into the first floor is designated as the next car. For instance if it was elevator car A the relay N would be energized. If the elevator car A were then dispatched from the first floor (break contacts SS3 open), the mechanism would hunt for another car at the first floor to be designated as the next car. The mechanism will only hunt as long as there is at least one one car located at the first floor.

The remaining relays in the left-hand column are all master relays which indicate that one of the cars in the system has been selected for the associated function. For instance, the master next car relay MN is energized if any one of the cars A, B or C has been designated as the next car (make contacts N8, BN8 or CN8 closed). Similarly, the relay MAHZ is activated if any car has been designated as the high zone available car, the relay MALZ is activated if any car has been designated the low zone available car, the relay MAN is activated if any car has been designated as the next available car, and the relay MANN is activated if any of the three cars is designated at the non-next available car. If one or more cars are traveling up in the high zone (for instance make contacts 81U8 and HZ5 closed indicating that the A car is traveling up in the high zone), the master up car in high zone relay MHU will be energized.

The relays shown in the right-hand column of FIG. 6 are common to the system and indicate the existence of the associated demand for service when energized. A down demand in the high zone will be registered by activation of the relay DDH if there is a down corridor call in the high zone registered (break contacts DCH1 closed), no car is assigned to answer down demands in the high zone (break contacts FDH2, BFDH2, and CFDH2 closed), and no car is in position to answer the down corridor calls in the high zone which would create such a demand. A car traveling in the down direction (break contacts 81D8 open) would not be in position to answer such calls if there were down calls registered in the high zone at floors above the position of the car (break contacts DBH3 closed). However, if a car is at the same floor or above the highest down call in the high zone, it is in position to answer down calls in the high zone as it travels down (break contacts DBH3 open). Since these calls are about to be answered, there is no reason to create a demand which would result in the dispatching of another car which would be serving other demands. If the car traveling down is above all the down calls in the high zone it is nevertheless not in a position to answer those down calls in the high zone if it has already been assigned either to answer up demands (make contacts FU5 closed) or to answer down demands in the low zone (contacts FDL3 closed).

A down demand in the high zone will not be registered, or if such a demand has been registered it will be cancelled, if there is a car traveling up in the high zone MHU1 open and at the same time there is a down call registered in the low zone (break contacts DCL1 open) and no car is in position to answer it (break contacts DDLC1 open). This is provided for in anticipation of the fact that the car traveling up in the high zone will soon become available to satisfy the down corridor calls in the high zone, therefore any available cars should be dispatched to answer the down calls in the low zone. However, when a car becomes available in the high zone (make contacts HZ6 and AV5 closed), the down demand in the high zone will be registered irrespective of any other car traveling up in the high zone, if the other conditions are met.

By way of example, assume that a down corridor call is registered in the high zone, that there are no cars traveling up in the high zone, that the A car is traveling down but with down calls behind it in the high zone, that the B car is above all the down corridor calls in the high zone but that it is assigned to answer down calls in a low zone and is conditioned for down travel to get there, and that the C car is traveling down to reach the lowest up call to which it has been assigned but that it is above all the down corridor calls in the high zone. Under these conditions, the down demand in the high zone relay will be energized through the following circuit:

L1, DCH1, MHU1, FDH2, DBH3, BFDH2, BFDL3, CFDH2, CFU5, DDH, L2

A down demand for the low zone is registered (relay DDL activated) if a down corridor call is registered in the low zone (break contacts DCL2 closed) and no car has been assigned to answer it nor is in position to answer it (break contacts DDLC2 closed).

The relay DDLC, as just mentioned, is used to cutout down demands in the low zone when a car is in position or assigned to answer those demands. A car assigned to answer down demands in the low zone will have its make contacts FDL4 closed. If any of the cars is so assigned the relay DDLC will be picked up opening the break contacts DDLC2 and thereby cancelling the demand for down service in the low zone. The relay DDLC may also be picked up by certain down traveling cars (make contacts 81D9 closed) which have not been assigned to up calls (break contacts FU6 closed). Such a car in the low zone is one which is above all the down calls in the low zone (make contacts DBL3 closed). This car is in a position to answer such calls so there is no reason for creating a demand. A car traveling down in the high zone (make contacts HZ7 closed), which has not been assigned to up demands (make contacts FU6 closed) will pick up the relay DDLC if a down demand in the low zone is not given preference before the car is running down with no down corridor calls in the high zone ahead of it (make contacts 78DD4 closed. Actually the pressure of such a car will prevent registration of a down demand in the low zone or it will canel one which is registered but not given preference before the car started down with no down calls ahead in the high zone.

Main floor demands (relay MFD activated) or basement demands (0FD relay activated) can only be registered if the system is not on down peak operation (break contacts ID3 closed) and no car has been assigned to the basement (break contacts M79–1 closed). Under these conditions if there is a down corridor call registered at the first floor (make contacts 1DR2 closed) or a basement car call is registered (make contacts 0UR2 closed), the basement demand relay 0FD will be energized. In order for a main floor demand to be created there must be no demand for basement service (break contacts 0FD1 closed). Furthermore, there must be no car already assigned to the first floor (break contacts M87–1 closed) and no next car at the first floor (break contacts MN4 closed). In fact, there can be no car at the first floor since even if there is only one car at the first floor it will be designated as the next car. If all these conditions are met a demand for service at the first floor will be created through the following circuit:

L1, ID3, M79–1, 0FD1, M87–1, MN4, MFD, L2

It is evident then that, subject to the priority of a basement demand, if there is no car at the first floor nor assigned to the first floor or the basement, a demand for a car at the first floor will be created. This is provided for in order to return a car to the first floor for any incoming traffic.

An up demand in the low zone (relay UDL activated) will be registered if there is an up corridor call registered in the low zone (break contacts UCL1 closed), no car is assigned to up demands in the low zone (break contacts FUL2, BFUL2, and CFUL2 all closed) and there is no car in position to answer such demands. A car traveling up (break contacts 81U9 open) would be in position if there were no up calls behind in the low zone (break contacts UBL3 open). As an example, consider a case where the only up call registered in the low zone is at the third floor and that the elevator car A which is located at the second floor is conditioned for up travel (break contacts 81U9 open). Under these conditions there are no up calls below the elevator car A in the low zone hence the break contacts UBL3 will be open. Since there is no path between contacts FUL2 and BFUL2 to complete the circuit for the relay UDL no up demand for the low zone will be created. This is logical since the elevator car A is traveling up and is just one floor below the registered up call. However, if the elevator car A was traveling up on an assignment to answer up calls in the high zone, it should not be diverted to answer the up call in the low zone and hence a demand for service will be registered through the make contacts FUH3. Similarly if the elevator car A had been traveling up on assignment to answer down calls in either the high zone or the low zone it would also not be proper for it to answer these up calls in the low zone and hence a demand for service should be registered so that another car may be assigned to answer the call. Under these circumstances energization is established through the make contacts FD5.

By way of example, consider the situation where there are up corridor calls registered in the low zone, no car has been assigned to answer such up calls, the A car is in position to answer such calls and is traveling up but has been assigned to serve up corridor calls in the high zone, the B car is traveling up but it is above the lowest up corridor call in the low zone and the C car is traveling down. Under these conditions an up demand in the low zone will be registered through the following circuit:

L1, UCL1, FUL2, FUH3, BFUL2, BUBL3, CFUL2, C81U9, UDL, L2

Up demands in the high zone are registered in a manner quite similar to the registration of up demands in the low zone. An up demand in the high zone will be registered (relay UDH activated) if there is an up corridor call in the high zone (break contacts UCH1), no car has been assigned to answer such calls (break contacts FUH4, BFUH4 and CFUH4 all closed) and no car is in a position to answer such calls. A car would be in a position to answer such calls if it were traveling up (break contacts 81U10 open) and it was at or below the floor at which the lowest up call in the high zone was registered (make contacts UBH3 open). However, if such a car were traveling up to answer a down demand (make contacts FD6 closed), an up demand in the high zone would be registered providing no other car had already been assigned to answer up calls in the high zone or was in a position to answer such calls. Consider a case where there are up corridor calls registered in the high zone, no cars have been assigned to answer such up corridor calls, the A car is traveling up and is below all the up corridor calls in the high zone but has been assigned to answer down demands, the B car is traveling up in a high zone but it is above the lowest up call in the high zone and the C car is traveling down. Under these circumstances an up demand in a high zone will be registered through the following circuit:

L1, UCH1, FUH4, FD6, BFUH4, BUBH3, CFUH4, C81U10, UDH, L2

FIGURE 7

Figure 7:
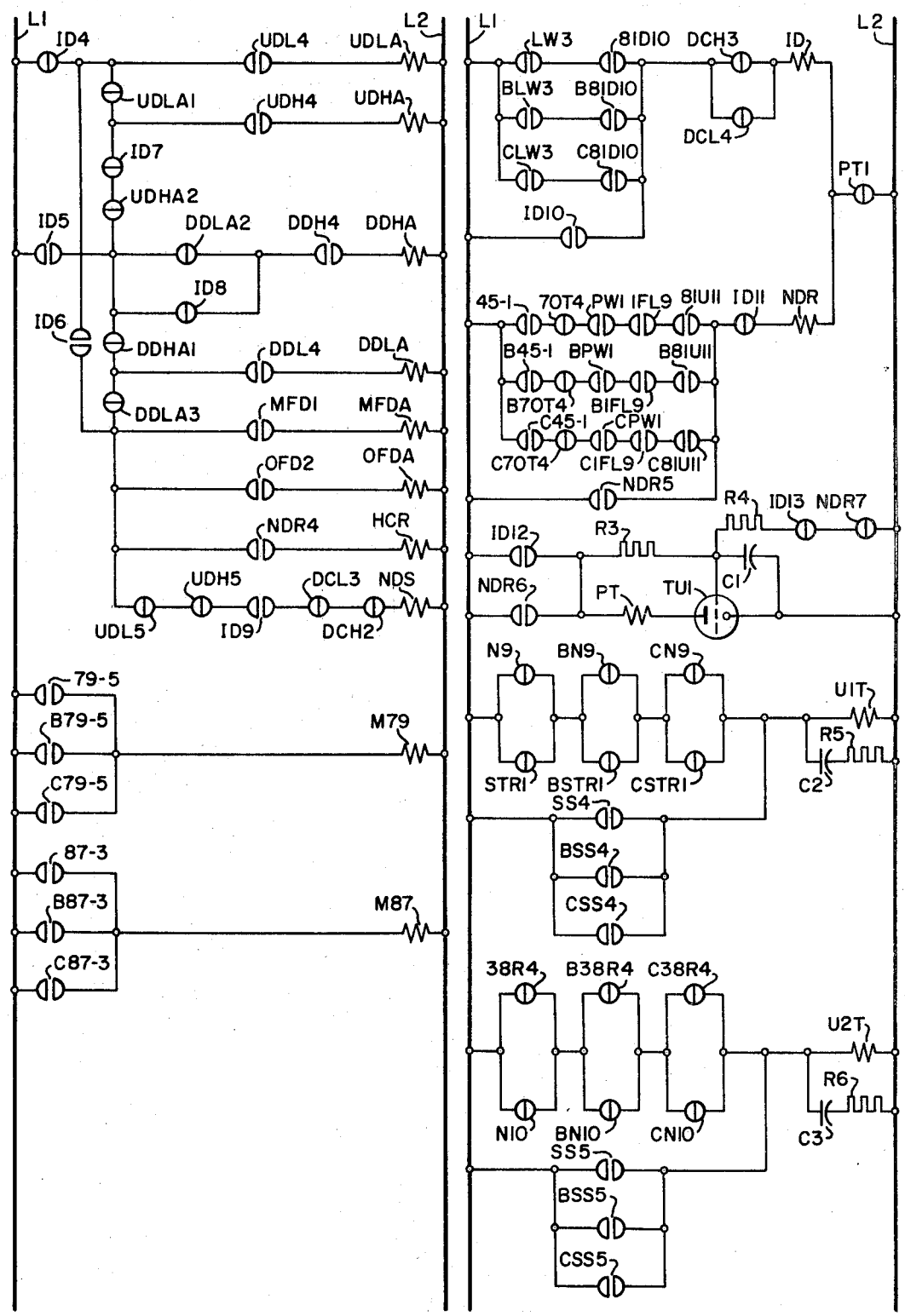

FIG. 7 illustrates the circuits for giving preferences to the various demands for service, the circuits for the master relays indicating that a car is assigned to the main floor or to the basement, the circuit for determining either up or down peak traffic operation and the various timing circuits.

Auxiliary relays associated with each type of demand for service are energized when an associated demand has been given preference. Only one of the auxiliary relays can be activated at a time. During normal operating conditions, the various demands for service are given preference in the following order:

(1) Up demands in the low zone
(2) Up demands in the high zone
(3) Down demands in the high zone
(4) Down demands in the low zone
(5) Basement demands
(6) Main floor demands.

It should be noted that the basement demands are given preference over the main floor demands, however, as will be seen later, a car assigned to the basement will stop at the first floor on the way down if there is a down call registered there and a car dispatched from the basement will stop at the first floor on the way if the need arises. In any event, a car will return to the main floor if its trip is completed in the basement and it is not reassigned in short order.

As an example of the manner in which demands are given preference, considered the situation where the only demand registered is a down demand in the low zone (make contacts DDL4 closed). If the system is not operating under down peak conditions, the make contacts ID5 and ID6 of the down peak relay will be open while the break contacts ID4, ID7 and ID8 will be closed. Under these conditions the auxiliary down demand in the low zone relay will be energized through the following circuit:

L1, ID4, UDLA1, ID7, UDHA2, DDHA1, DDL4, DDLA, L2

As will be seen shortly, the next car to become available would be assigned to answer the down demand in the low zone. However, if before a car were assigned to the down demand in the low zone a demand of higher priority were created it would take preference. For example, suppose that before a car could be assigned to answer the down demand in the low zone, an up demand in the high zone is registered (make contacts UDH4 closed). The following circuit would be completed to energize the auxiliary up demand in a high zone relay:

L1, ID4, UDLA1, UDH4, UDHA, L2

Upon activation of the relay UDHA its break contacts UDHA2 would open thus deenergizing the relay DDLA. If instead of an up demand in the high zone, a down demand in the high zone is registered (the relay DDHA is energized), this demand would also be given preference over the down demand in the low zone. This would be true despite the fact that the break contacts DDLA2 would be open because the break contacts ID8 of the down peak relay would be closed.

During up peak operation the order of preference given to the various demands is the same. However, under these conditions the cars do not remain available at the floor at which they complete their trips. Instead, the make contacts NDR4 of the no demand return relay are closed so that if there are no demands registered at the time that a car becomes available above the first floor, the relay HCR will be activated. As will be seen later, this will be effective to return the car to the main floor. This is done in anticipation of heavy traffic in the up direction from the main floor under up peak conditions.

Under down peak conditions the order of preference given the demands for services is turned around. Down demands for service are given priority over up demands. When predetermined conditions indicate that there is a very large demand for down service, the down demand relay ID will be energized, closing the make contacts ID5 and ID6 and opening the break contacts ID4, ID7 and ID8.

In order to equalize service during down peak operation, preference is alternated between down demands in the high zone and down demands in the low zone. The first down demand to be registered will be given preference. If a down demand in the low zone is the first down demand to be registered, the relay DDLA will be energized through the following circuit:

L1, ID5, DDHA1, DDL4, DDLA, L2

Upon activation of the relay DDLA, the contacts DDLA2 will open thus preventing a subsequently registered down demand in the high zone (make contacts DDH4 closed) from being given preference. It should be remembered that under these conditions the break contacts ID8 are open. When a car has been assigned to the down demand in the low zone, the contacts DDL4 will open thus dropping out the relay DDLA. This in turn will permit the break contacts DDLA2 to close and if the down demand in the high zone is still registered it will be given preference (relay DDHA activated). Activation of the relay DDHA will result in opening of the break contacts DDHA1 thus holding a subsequently registered down demand in the low zone in abeyance. This alternating of preferences is desirable because during down peak periods when there are numerous down calls being registered continuously, those passengers waiting for down service in the low zone would be completely ignored if there was never a let up for down demand service in the high zone. If there are no down demands registered in either the high zone or the low zone, up demands in the low zone will be given next preference with last preference being given to the up demands in the high zone. By reference to FIG. 6, it will be noted that no demands for service at the main floor or the basement floor can be created during down peak conditions. This presents no problem for persons waiting at the main floor for service because the cars will be completing their down trips at that floor. During these periods there is little likelihood of demand for service in the basement and it is in the interest of overall traffic flow to ignore any calls in the basement at this time. If during the period while the system is conditioned for a down peak operation there is an instant when the only demand registered is an up demand in the high zone the relay UDHA will be activated through the following circuit.

L1, ID5, DDHA1, DDLA3, ID6, UDLA1, UDH4, UDHA, L2

As with any other demand preference, if a demand commanding a higher preference is registered before a car is assigned to answer the up demand in the high zone, the next car to become available will be assigned to the demand with the higher preference.

It is possible in a three car system with only two major zones, that a situation could arise where a car is available for service but has nowhere to go. Since under down peak conditions it is desirable to have as many cars as possible serving the down calls, the no demand service relay NDS is provided to dispatch cars to the highest down call even though there are no demands for service in the down direction registered. A situation could occur for example where one car is traveling down in the high zone and the down calls are all below the car, while at the same time another car is traveling down in the low zone with all the down calls in the low zone below the car. Under these conditions, no down demands exist. If, at the same time, there are no up demands, an available car would have nowhere to go. The relay NDS assures that a car will be assigned to down calls during a down peak condition. As will be seen below, contacts of the relay NDS are used to dispatch the car to the highest down call. To summarize, the relay NDS will be activated if there are no demands in the up direction (break contacts UDL5 and UDH5 closed), down corridor calls are registered in both the high and low zones (break contacts DCL3 and DCH2 closed) and the system is in down peak operation (make contacts ID9 closed).

The master basement assignment relay M79 is energized if any of the cars are assigned to basement demands. For example, if the elevator car A has been assigned to answer basement demands its make contact 79-5 will be closed. The conditions under which an individual car will be assigned to demands in the basement will be discussed shortly. Similarly, the master main floor assignment relay M87 will be activated when one of the cars has been assigned to main floor demands. For example, if the elevator car A is assigned to main floor demands its make contacts 87-3, the operation of which will be explained below, are closed thereby completing a circuit for the energization of the relay M87.

The system will go into down peak operation if a car conditioned for down travel (make contacts 81D10 closed) is loaded to capacity (make contacts LW3 of the load weighing switch closed. To avoid a false indication, down corridor calls must exist in either the high zone or the low zone (either break contacts DCH3 or DCL4 closed). If such conditions are met, for instance if the A car is traveling down with a full load and a down call is registered in the high zone, the system will go into down peak operation by activation of the relay ID through the following circuit:

L1, LW3, 81D10, DCH3, ID, PT1, L2

The down peak relay ID is maintained in an energized condition through its holding contacts ID10. Thus the system will be kept on down peak operation even though there may be a momentary lapse in the conditions necessary to initiate down peak operation. This could occur for instance where a down traveling car which initiated down peak operation discharges its passengers at the first floor and no other car is yet fully loaded for down travel. The relay ID will remain energized until the break contacts PT1 of the timing relay are open. As will be discussed shortly, this relay is picked up at a predetermined time after the conditions first exist to send a car into down peak operation. When the timer is timed out the contacts PT1 will open and after the relay ID has been deenergized they will reclose. If the conditions for down peak operation still exist, that is there is a fully loaded car conditioned for down travel and there are down demands in either of the high zone or the low zone, then the down peak relay ID will be reenergized for another predetermined period. This holding period could be for any lenght of time, but a practical duration is 2½ minutes.

The contacts PT1 also serve to maintain the system conditioned for up peak operation once the necessary conditions exist. Since it is desirable to have cars return to the first floor as soon as possible when the system is operating under up peak operating conditions the master relay for up peak operations is designated as no demand return relay and is given the reference character NDR. The relay NDR will be activated if a car leaves the first floor in the up direction with a heavy load. If a car is loaded to 50% of capacity the make contacts PW1 of the up peak weighing relay will be closed. To avoid a false signal as where all passengers from a down traveling car that was heavily loaded have not yet left the car, the relay cannot pickup until the doors start to close (make contacts 45-1 closed) and the interference time has expired (break contact 70T4). If the elevator car A satisfies these conditions, the no demand return relay NDR will be picked up through the following circuit:

L1, 45-1, 70T4, PW1, 1FL9, 81U11, ID11, NDR, PT1, L2

The break contacts ID11 of the down peak relay assure that down peak operation will be given preference over up peak operation. Once the relay NDR is activated it will remain energized through its holding contacts NDR5 until contacts PT1 of the peak timing relay open or down peak conditions exist. As in the case with down peak operation, the system is maintained in the up peak condition for a predetermined time to prevent intermittent operation if the up peak condition should be lost momentarily.

Figure 10:
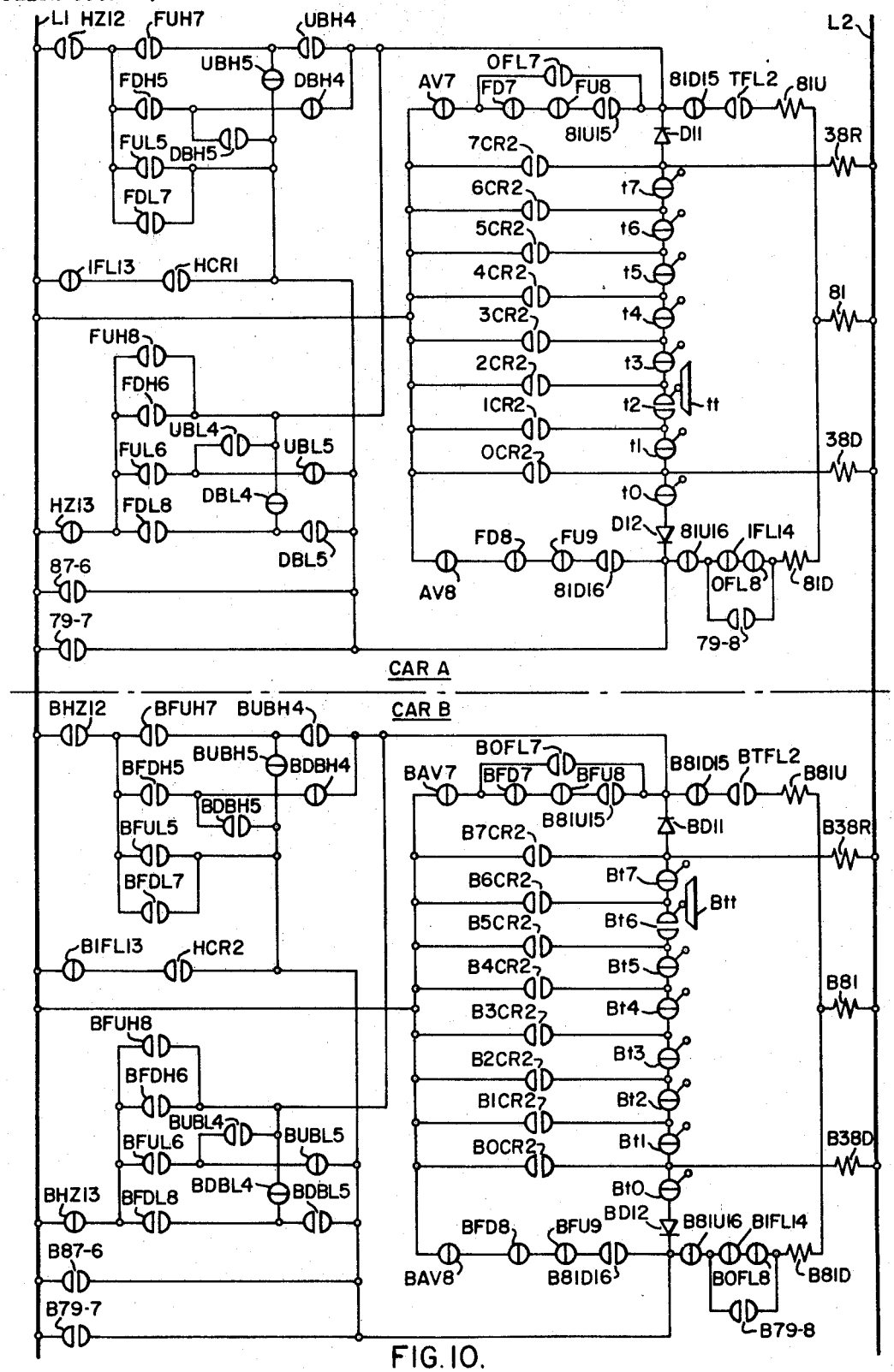

The operation of the timing relay PT is similar to that of the relay DT shown in FIG. 10 of our prior patent. The major difference is that the relay PT is used for timing both up peak and down peak operation hence alternate contacts for the ID and NDR relays are employed in place of the PD contacts in the patent. Briefly stated operation of the relay PT is as follows. When the relay ID, for instance, is intially energized, make contacts ID12 are closed and break contacts ID13 are opened. The relay DT will not be activated at this time since the tube TU1 is not in a conductive state. The capacitor C1, which controls the bias voltage on the thyratron tube, will charge at a rate determined by the charging resistor R3. When the voltage on the capacitor C1 reaches a predetermined value the tube TU1 will fire thus activating the relay PT. This in turn will open the break contacts PT1 deenergizing the relay ID. This will result in the opening of the contacts ID12 deenergizing the relay PT, and the closing of the contacts ID13 permitting the capacitor C1 to discharge through the resistor R4. In summary, the relay PT will become energized at a predetermined time after the relays ID or NDR are initially picked up. Upon activation of the relay PT break contacts PT1 will open thereby deenergizing the relay ID or NDR.

The relays U1T and U2T are the dispatching interval relays. It should be remembered from FIG. 1 that break contacts of these relays are utilized in the circuits of the main floor starting relays which dispatch the next car from the main floor. The relay U1T is controlled by a relay in a photoelectric circuit which includes a light beam projected across the entrance to the elevator. The relay U1T will time out a predetermined interval after the light beam is reestablished following the boarding of a passenger. By way of example, consider a situation where the elevator car A has been designated as the next car (break contacts N9 open). With the light beam across the entranceway established the break contacts STR1 of the light beam relay are open also and hence the relay U1T is deactivated. If a prospective passenger should now enter the car, thus momentarily breaking the light beam, the relay STR would drop out and its break contacts STR1 would be closed. Since only one car at a time can be designated as the next car, the break contacts BN9 and CN9 are necessarily closed. Under these conditions the relay U1T is energized through the following circuit:

L1, STR1, BN9, CN9, U1T, L2

When the passenger has passed through the entranceway to the car, the light beam will be reestablished and the contact STR1 will open thereby opening the circuit which energized the relay U1T. However, there is a delay in dropout of the relay U1T due to the RC circuit composed of capacitor C2 and the resistor R5 which is shunted around the coil of the relay U1T. The duration of the delay in dropout may be adjusted by varying the values of the capacitor C2 and resistor R5, however, a practical length of time is 5 seconds. When the relay U1T drops out, the car will be dispatched if an up car call is registered and the other conditions for dispatching are met. When the elevator car A is dispatched from the first floor the make contacts SS4 of the main floor starting relay will be closed thus reenergizing the relay U1T. This recycles the timing circuit and prevents dispatching of another car for at least the minimum dispatching interval. As will be remembered from the discussion of FIG. 1, when the elevator car A moves away from the first floor the main floor starting relay SS will dropout thus opening the contacts SS4.

Since it is possible that successive passengers will enter the elevator car before the relay U1T is dropped out thus recycling the timer and preventing dispatching of the car, a second dispatching interval time U2T is provided. For a better understanding of the operation of this relay, consider the elevator car A again designated as the next car (break contacts N10 open). If there are no up car calls registered in the elevator car A the relay U2T will be activated through the following circuit remembering that only one car can be designated as the next car at any one time:

L1, 38R4, BN10, CN10, U2T, L2

If a passenger now presses a car call button for a floor above the first floor, the relay 38R will be picked up and its break contacts 38R4 will open thus interrupting the energizing circuit for the relay U2T. The relay U2T will not dropout immediately, however, because it is also shunted by an RC circuit composed of capacitor C3 and resistor R6 which provides a delay in dropout. Again the duration of this delay may be set at any value, however, a realistic figure is 15 seconds. When U2T drops out the car will be dispatched if the other conditions are met. Again the starting of the elevator car A will close make contacts SS5 to reset the timing relay U2T.

Hence it will be seen that if successive passengers entering the elevator car prevent dropout of the relay U1T, the relay U2T will dropout and thereby dispatch the car 15 seconds after the first car call is registered.

FIGURE 8

This figure illustrates the circuits by which the individual cars are assigned to up or down demands in either the high or the low zone, and the circuits which indicate whether a particular car has been assigned to up demands or down demands. Association of the various components with all of the cars or with a particular car is indicated by appropriately labeled brackets at the bottom of the figure as in previous figures.

The order in which available cars are assigned to demands for service in the high zone are identical for both up demands and down demands. Quite naturally the first car that is sought to satisfy demands in the high zone is the high zone available car. If there is no high zone available car, the system looks for the low zone available car next, then for the non-next available car and finally to the next available car.

By way of example, consider the situation where a down demand for service in the high zone has been given preference, where no car is available in the high zone, where the A car is available in the low zone, the B car is the next available car and the C car is on an assignment and is therefore not available. Since the down demand in the high zone has been given first preference, make contacts DDHA2 and DDHA3 will be closed. Since no car is available in the high zone, the make contacts AHZ4, BAHZ4 and CAHZ4 (not shown) are all open. The break contacts MAHZ5 then of the master available car in the high zone relay will be closed indicating that no car is available in the high zone. Since it is posited that the A car is designated as the available car in the low zone, make contacts ALZ4 will be closed and the down demand in the high zone assignment relay of the A car, relay FDH, will be activated through the following circuit:

L1, DDHA2, MAHZ5, ALZ4, DDHA3, FDH, L2

Even though the make contacts BAN2 indicating that the B car is the next available car and the contacts DDHA4 are closed, the down demand in the high zone assignment relay for the B car, relay BFDH, will not be energized because the break contact MALZ5 of the master low zone available car relay will be open.

If the elevator car A is designated as the high zone available car and up demands in the high zone are given preference, the elevator car A will be assigned to answer the up demands in the high zone by energization of its up demand in the high zone assignment relay FUH through the following circuit:

L1, UDHA3, AHZ4, UDAH4, FUH, L2

The purpose of the assignment relays is twofold. First, they are effective to initiate response of the car to the demand for service as will be seen in the discussion of FIG. 10 below. Secondly, the assignment relay is effective to cause the car to ignore other calls while it is traveling to answer the calls associated with the assigned demand. This latter feature was discussed in connection with the stopping relay shown in FIG. 2. As long as the assignment relay is activated, the car will not stop for corridor calls. Hence, a car which must travel in the same direction as the demand for service in order to reach the first assigned call, should retain the assignment indication until it reaches the zone of assignment. In other words, if the car A at the first floor has been designated as the next available car and it is assigned to up demands in the high zine, the indication of assignment will be maintained until the car reaches the high zone. This is done so that the A car while traveling up through the low zone will ignore up calls in that zone. When the car A reaches the high zone, however, it should stop for all up calls in that zone and therefore energization of the relay FUH is no longer necessary. Under the circumstances just described the relay FUH will remain activated as long as there are up calls in the high zone (break contacts UCH2 closed) through its holding contact FUH5 until the elevator car A reaches the high zone. Since the car is traveling up, the break contacts 81U12 are open and the relay FUH is held in as long as the break contacts HZ8 are closed indicating that the elevator car A is not in the high zone.

On the other hand, if a car must travel in the direction opposite to that indicated by the demand for service, the car will maintain its assignment indication until it reaches the floor at which it must change direction. For instance, if the elevator car A had been designated as the high zone available car, is assigned to answer up demands in the high zone and it is above the lowest up call in the high zone, it must travel down before it can satisfy the demand. During the downward travel it is necessary that the car A maintain its indication that it is assigned to up demands in the high zone so that it will not stop for down calls that it passes. The relay FUH remains energized during downward travel of the elevator car A through the following circuit:

L1, UCH2, FUH5, 81U12, FUH, L2

When the floor selector of the elevator car A notches into the lowest floor in the high zone at which an up call is registered, relay 81U will be activated opening the break contacts 81U11 thus deenergizing the relay FUH. It might be pointed out that the relay FUH could not be maintained in the energized condition through the contacts of the UDHA relay because these contacts will open since the demand is cancelled when a car is assigned to answer a demand. In addition the car loses its availability designation when it is assigned to a demand.

In a like manner the relay FDH will be maintained in an energized condition through its holding contacts FDH3 as long as there is a down corridor call registered in the high zone (break contacts DCH4 closed) and the car which has ben assigned is not conditioned for down travel (break contacts 81D11 closed). This means that if a car which was assigned to answer down demands in the high zone was above the highest down corridor call in the high zone the relay FDH would only remain activated long enough to start the car on its downward travel. Once the car has started down the relay 81D11 would be open thus deactivating the relay FDH. If on the other hand a car has to travel up to reach the highest down corridor call in the high zone the relay FDH remains energized until the floor selector of the car notches into the floor at which the highest down call is registered.

It should be recalled from the discussion of FIG. 7 that if during down peak operation a condition exists wherein there are no down demands for service although down calls are registered for both the high zone and the low zone, the relay NDS will be activated. If at the same time a car should become available, it will be dispatched to answer the highest down call in the high zone through activation of its down demand in the high zone assigned relay even though no demand for such service is registered. As was discussed previously, this was done to ensure full utilization of the cars available during down peak operation. Energization of the relay FDH under these circumstances, if we assume that the elevator car A becomes designated as the low zone available car, will be accomplished through the following circuit:

L1, NDS3, MAHZ5, ALZ4, NDS5, FDH, L2

Assignment of elevator cars to up demands in both the low zone and the high zone are very similar to the assignment of cars to down demands although the preference of assignment is altered somewhat to conform to the following sequence:

(1) Low zone available car
(2) Non-next available car
(3) High zone available car
(4) Next available car.

Again an assigned car maintains its assignment indication only until it enters the assigned zone if it is traveling in the same direction as the demand for service. If a car is within the zone to which it is assigned, it will only maintain the assigned indication long enough to start the car moving toward the first corridor call in the assignment if it must move in the same direction as the demand for service in order to get to the first corridor call. If, however, the car must travel in the opposite direction to that of the demand for service to which it is assigned, it will maintain its assignment indication until it notches into the floor which it is to reverse its directon.

Consider the case where the elevator car A has been designated the high zone available car and is the only car available for service, and that there is a demand for service in the up direction in the low zone which has preference. The elevator car A will be assigned to answer this demand by the energization of the relay FUL through the following circuit:

L1, UDLA2, MALZ6, MANN4, AHZ5, UDLA3, FUL, L2

If the elevator car A is designated the high zone available car and it is the only car that is available it is necessarily located in the high zone. Therefore, it must travel down to the lowest up coridor call in the low zone in order to perform its assigned task. The relay FUL will remain activated during the downward travel of the elevator car A as long as up corridor calls are registered in the low zone through hte following circuit:

L1, UCL2, FUL3, 81U13, FUL, L2

However, if the elevator car A is in the low zone and is below the lowest up call in the low zone, contacts 81U13 will be open hence the relay FUL will only remain energized long enough to condition the car A for its upward travel. Contacts 1FL10 are shunted around contacts 81U13 so that if the next car or the non-next available car is assigned to answer up demands in the low zone the relay FUL will remain energized long enough to dispatch the car from the first floor (see FIG. 1). Similarly, the contacts 0FL4 shunt the 81U13 contacts to maintain FUL energized when an available car in the basement is assigned to up demands in the low zone.

Cars are assigned to answer down demands in the low zone, relay FDL energized, in the same manner. Consider the case where the A car has been designated as the high zone available car and there is a demand for down service in the low zone. The relay FDL will be activated through the following circuit:

L1, DDLA4, MALZ6, MANN4, AHZ5, DDLA5, FDL, L2

Since the elevator car A must travel down to get to the highest down demand in the low zone the relay FDL will remain energized through the following holding circuit until the car leaves the high zone:

L1, DCL5, FDL5, HZ9, FDL, L2

If the elevator car A had been below the highest down corridor call in the low zone the relay FDL would have remained energized until the floor selector notched into the floor at which the highest down call in the low zone was registered at which time the make contacts 81D12 would have opened. The operation of relays 81U and 81D during low and high call reversals will be described shortly.

A down demand assigned relay FD when energized indicates that the elevator car A is assigned to down demands either in the high zone or the low zone. It is activated by make contacts FDH4 of the down demand in the high zone assigned relay or with the make contacts FDL6 of the down demand in the low zone assigned relay. Similarly, the up demand assigned relay FU is energized either by the make contacts FUH6 of the up demand in the high zone assigned relay or the make contacts FUL4 of the up demand in the low zone assigned relay thus indicating that the elevator car A is assigned to up demands.

FIGURE 9

Figure 9:
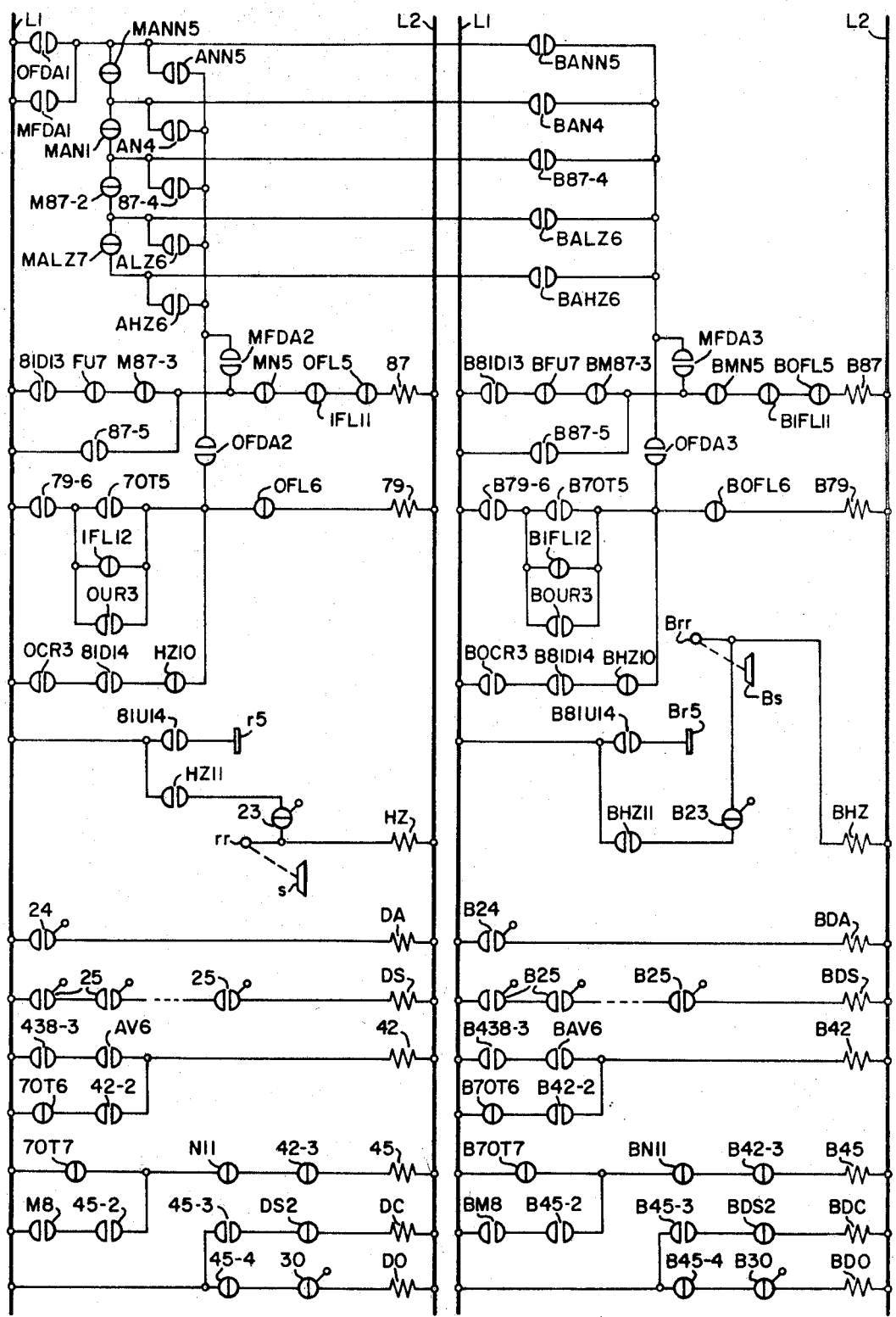

Shown in FIG. 9 are the circuits for the main floor assignment relay, basement assignment relay, the high zone relay and the various door and door control relays.

Assignment of a car to the first floor is indicated by energization of the 87 relay. If no other car has been assigned to the first floor (break contacts M87–4 and M87–5 (associated with the C car and not shown) of the master main floor assignment relay closed), the first car to run in the down direction (make contacts 81D12 closed) which is not assigned to up demands (break contacts FU7 closed) will pickup its 87 relay provided no other car is located at the first floor (break contacts MN4, MN5 and MN6 (associated with the C car and not shown) closed). The 87 relay of the A car is then energized through the following circuit:

L1, 81D13, FU7, M87–3, MN5, 1FL11, 0FL5, 87, L2

Once picked up the 87 relay is maintained in its activated condition through its holding contacts 87–5. As soon as the floor selector of the elevator car A notches into the first floor, the break contacts 1FL11 of the main floor relay open deenergizing the 87 relay. It should be noticed that a car in the basement (break contacts 0FL5 open) cannot be assigned to the main floor; however, it should be remembered from the prior discussion that if a car in the basement is not given an assignment it will return to the main floor.

If there are no cars running down, an available car is assigned to the main floor in the following sequence:

(1) Low zone available car, or
(2) High zone available car.

If there are no cars at the first floor and none traveling in that direction, a main floor demand will be created. If this demand has been given preference (make contacts MFDA1 closed) and the only car available is the A car which is designated the high zone available car, the 87 relay of the elevator car A is energized through the following circuit:

L1, MFDA1, MANN5, MAN1, M87–2, MALZ7, AHZ6, MFDA2, MN5, 1FL11, 0FL5, 87, L2

Since there must be a next car at the first floor before there can be a non-next car and since there can be no main floor demand if there is a next car or if a car is already assigned to the main floor, the contacts ANN5, AN4 and 87–4 have no effect on the operation of the 87 relay. This is also true of the contacts MANN5, MAN1 and M87–2. The purpose of the 87 relay is to bring an available car down to the first floor unless there is a car traveling down serving down calls. Since this car is very likely to complete its trip at the first floor or at least close to the first floor, there is no reason to start another car down.

The basement assignment relay 79 is energized whenever there is a need for a car in the basement. There are three situations which can create a need for the car in the basement:

(1) A car call
(2) A down corridor call at the first floor, and
(3) An up corridor call in the basement.

The latter two situations, it will be remembered, can create a basement demand for service. The basement car call will energize the 79 relay directly when the car is traveling in the down direction and is below the high zone through the following circuit:

L1, 0CR3, 81D14, HZ10, 0FL6, 79, L2

The restriction that the car be below the high zone is imposed since it will take a certain amount of time for a car in the high zone to reach the basement even if it has no other stops to make. By delaying assignment of this car to the basement, another car can be assigned to answer the basement demand, if available, thus expediting service for the basement. However, if a car is traveling down in the low zone to discharge a passenger at the basement in response to a car call it will be able to serve the basement demand in short order and there is no reason for assigning another car.

When a car is assigned to the basement in response to a basement car call the 79 relay will remain energized until the floor selector notches into the basement (break contacts 0FL6 open), because the make contacts 81D14 of the down preference relay will remain closed during the down trip even while the car makes intermediate stops.

It will be recalled from the discussion of FIG. 6 that if the system is not operating under down peak conditions, a down corridor call at the first floor or an up corridor call in the basement will create a basement demand for service unless a car has already been assigned to the basement. To serve basement demands for service, available cars are selected as follows:

(1) Non-next car
(2) The next car
(3) Car assigned to the main floor
(4) Low zone available car
(5) High zone available car.

If the basement demand for service is given preference, the make contacts 0FDA1 and 0FDA2 are closed. Suppose that the elevator car A is assigned to the first floor (relay 87 energized) and the basement demand for service is given preference. Under these conditions there will be no car at the first floor because it will be remembered from the discussion above that if relay 87 is energized there are no cars at the first floor (break contacts MN5 closed). The elevator car A will be assigned to the basement demand when the relay 79 is energized through the following circuit:

L1, 0FDA1, MANN5, MAN1, 87–4, 0FDA2, 0FL6, 79, L2

With the 87 relay energized the break contacts M87–2 will be open thus preventing the assignment of the low zone or the high zone available car to answer the basement demand.

If the basement demand for service is created by an up corridor call in the basement (make contacts 0UR3 closed), the relay 79 is held in by the following circuit:

L1, 79–5, 0UR3, 0FL6, 79, L2

The 79 relay will remain energized until the elevator car A notches into the basement floor (break contacts 0FL6 open).

If the basement demand for service is created by a down corridor call at the first floor, the relay 79 remains energized while the assigned car is above the first floor through the make contacts 79–6 and the break contacts 1FL12. As the floor selector of the car A notches into the first floor, the contacts 1FL12 open; however, the contacts 70T5 of the non-interference relay will remain closed thus maintaining energization of 79 relay, for sufficient time to allow someone to enter the car and register a down call for the basement. If the passenger presses the basement car call button before the non-interference time expires the 79 relay will remain energized through the 0UR3 contacts and the car will continue on down to the basement. If, however, for some reason no one presses the car button for the basement within the non-interference time the contacts 70T5 open deenergizing the 79 relay. The car can then become available at the main floor to serve other demands.

The relay HZ indicates when the elevator car A is in the high zone. As the floor selector of the car A which is traveling in the up direction (make contacts 81U14 closed) notches into the fifth floor, the lowest floor in the high zone for the system described, the brushes rr come in contact with the segment r5 to complete the following circuit for energization of the relay HZ:

L1, 81U14, r5, rr, HZ, L2

The relay HZ remains energized as long as the car is in the high zone through break contacts HZ11 and the normally closed switch 23. When the floor selector of the elevator car A notches into the fourth floor, the highest floor in the low zone in the system illustrated, the cam s on the carriage of the floor selector trips the switch 23 thus breaking the holding circuit for the relay HZ. Any time the car is not in the high zone then the relay HZ is deenergized.

The auxiliary door relay DA is energized whenever the doors of the car are closed or within a few inches of closing (switch 24 closed). Contacts of the relay DA are utilized in the available car circuit so that availability can be determined before the doors of the car are completely closed.

The door relay DS which indicates that all the doors associated with the particular elevator car are closed, door control relay 45, the door close relay DC and the door open relay DO were similar in operation and function to the corresponding relays in our prior patent. For a detailed description of the operation of these relays refer to the explanation of FIG. 4 of the patent. The auxiliary door control relay 42 corresponds to the relay 42 in our prior patent. Its function, as there, is to open the doors of an available car when it has been assigned to a call at the floor at which the car is standing. The contacts 438–3 correspond to the contacts S2 of the stopping relay in our prior patent and the contacts AV6 correspond to the contacts FR6 in that patent. Since from the discussion above it is evident that the available car relay AV drops out when the relay 438 is activated under the described circumstances, the relay 42 only receives a pulse of energy through the 438 and AV contacts. In order to ensure proper door operation, the holding contacts 42–2 were added. This will ensure energization of the 42 relay through the break contacts of the non-interference relay 70T6 until the non-interference relay is energized (see FIG. 1) thus initiating door opening.

FIGURE 10

FIG. 10 illustrates the circuits for the auxiliary running relays, the up and down preference relays and the car call above and below relays. In this figure, the components associated with the elevator car A are shown in the top half of the figure while those associated with the elevator car B are shown in the lower half.

In order to simplify the presentation and since the circuits for each car are identical, the discussion will be restricted to the operation of the elevator car A. Closure of the contacts 0CR3 and 1CR2 through 7CR2 indicate the registration of a car call for the elevator car A for the basement and first through seventh floors respectively. The contacts $t0$ and $t1$ through $t7$ are normally closed mechanical switches located on the floor selector and associated with the basement and first through seventh floors respectively. The cam $tt$ is mounted on the floor selector carriage in such a manner that it mechanically opens the switch $t$ associated with the floor at which the carriage is located. These switches cooperate with the cam to determine which direction the elevator car A must travel in order to respond to a registered car call. For example, in FIG. 10 the elevator car A is shown at the second floor. Hence the cam $tt$ is holding the switch $t2$ open. Assuming that a car call were registered in the elevator car A for the fifth floor (make contacts 5CR2 closed), the relay 38R, indicating that a car call was registered for the floor above the floor at which the car is located, would be energized through the following circuit:

L1, 5CR2, $t6$, $t7$, 38R, L2

At the same time the up preference relay 81U and the auxiliary running relay 81 would be activated through the following circuit:

L1, 5CR2, $t6$, $t7$, D11, 81D15, TFL2, 81U, 81, L2

As explained in the discussion of FIG. 1 the elevator car A will then travel in the up direction to answer the car call. Activation of the relay 81U causes the break contacts 81U16 to open so that subsequently registered car calls for floors below the location of the car will be disregarded. As the elevator car A arrives at the fifth floor and comes to a stop the contacts 5CR2 will open; however, the relays 81U and 81 will be held in by the holding contacts 81U15 through the following circuit:

L1, AV8, FD7, FU8, 81U15, 81D15, TFL2, 81U, 81, L2

Since there are no further car calls above the car and since there are no up corridor calls ahead the car A will become available when the doors are within a few inches of closing (break contacts AV7 open). This will result in deenergization of the 81U and 81 relays and the elevator car A will await further assignment. If, however, a car call is still registered for a floor above the fifth floor, for instance the seventh floor, relays 81U and 81 are held in by the car call contacts (here, make contacts 7CR2). After discharging the passenger at the fifth floor then the car continues on up to the seventh floor, whereupon the top floor relay contacts TFL2 open thus deactivating the relays 81U and 81.

On the other hand if the elevator car A was at the second floor and a car call was registered for the first floor (make contacts 1CR2 closed), the elevator car A would have to travel down in order to serve the call. Since the open contact $t2$ is now above the registered car call the relays 38R and 81U cannot be activated. Instead, the car call below relay 38D will be activated through the 1CR2 contacts, and the down preference relay 81D along with the relay 81 will be activated through the following circuit:

L1, 1CR2, $t1$, $t0$, D12, 81U16, 1FL14, 0FL8, 81D, 81, L2

Activation of the relay 81D and 81 will initiate downward movement of the elevator car A and opening of the break contacts 81D15 so that any subsequently registered car calls for floors above the first floor will be disregarded. Since it is assumed that the car has not been assigned to up or down demands and is not available for service, the following holding circuit is established:

L1, AV8, FD8, FU9, 81D16, 81U16, 1FL14, 0FL8, 81D, 81, L2

When the floor selector of the elevator car A notches into the first floor, the break contacts 1FL14 open thus deenergizing relay 81D and 81.

The cam $tt$ is long enough so that it will open the next successive switch key before allowing the former to close. The diodes D11 and D12 are provided to prevent false activation of the relays 38R and 38D when the relays 81U and 81D are activated by means other than car calls, such as the means to be discussed next.

When the elevator car A is assigned to demands for service or under other conditions to be herein described, the up and down preference relays and the auxiliary running relay are controlled by the circuits on the left hand side of FIG. 10. If the elevator car A is in the high zone and is assigned to answer demands in the high zone, whether the car will travel up or down depends upon the relative position of the car at the time of assignment with respect to the assigned calls. For purposes of illustration assume that the elevator car A is in the high zone, that it has been assigned to up demands in the high zone but that it is below the highest up call registered in the high zone (make contacts UBH4 closed). Under these circumstances, the relay 81U, and in turn the relay 81, will be energized to start the car moving in the up direction through the following circuit:

L1, HZ12, FUH7, UBH4, 81D15, TFL2, 81U, 81, L2

As was discussed previously (FIG. 8), energization of the relay 81U will deenergize the relay FUH thus opening the make contacts FUH7. However, the relay 81U will remain energized through the following holding circuit since it is considered not available, and is no longer assigned to up or down demands.

L1, AV7, FD7, FU8, 81U15, 81D15, TFL2, 81U, 81, L2

(The relay 81U is provided with a slight delay in dropout so that it remains closed until the relay FU8 drops out to complete the holding circuit through the break contacts FU8.) The elevator car A will thus continue to answer up corridor calls above it in addition to serving car calls above.

If under the above conditions the elevator car A is above the highest up call in the high zone (break contacts UBH5 closed and make contacts UBH4 open), the relay 81D is energized to initiate downward movement of the elevator car. The elevator car A travels down until its floor selector notches into the floor position at which the lowest up corridor call in the high zone is registered. At this time the relay UBH is energized opening the break contacts UBH5 and closing the make contacts UBH4. When the contacts UBH5 open the relay 81D is deenergized. It cannot be held in through the contacts 81D16 since the relay FUH remains energized keeping the contacts FU9 open until 81U is picked up (see FIG. 8). The relay 81U is now energized through the make contacts UBH4 and stopping is initiated through the contacts D6 and 81D5 of FIG. 2.

If the elevator car A is in the high zone, is assigned to down calls in the high zone and is above the highest down call registered in the high zone, the relay 81D, indicating that the car must travel in the downward direction, is energized through the following circuit:

L1, HZ12, FDH5, DBH5, 81U16, 1FL14, 0FL14, 0FL8, 81D, 81, L2

Energization of the relay 81D drops out the relay FDH (see FIG. 8) but the down preference relay remains energized through its holding contacts 81D16 during the downward trip. (The relay 81D is provided with a slight delay in dropout to permit the contacts FU9 to close thus completing the holding circuit.)

If the elevator car A is in the high zone and is assigned to down calls in the high zone but is below the highest down corridor call registered, the up preference relay 81U is energized through the break contacts DBH4. The relay 81U is not held in through holding contacts 81U15 since the break contacts of the down call assigned relay FD7 are open. The car travels up until it reaches the highest down corridor call registered at which time the relay DBH is energized opening the contacts DBH4 and closing the contacts DBH5. Since there is no holding circuit for 81U, it is deenergized, while the down preference relay 81D is energized through the contacts DBH5. When the relay 81D picks up, the relay FDH is deenergized (see FIG. 8) thus opening contacts FDH5, but with the delay in dropout of relay 81D, the holding circuit for relay 81D is completed when the break contacts FD8 close.

If the elevator car A is in the high zone and is assigned to demands in the low zone it must necessarily go down whether those demands in the low zone are up demands or down demands. Assume that the elevator car A is assigned to down demands in the low zone so that the relay 81D is energized through the contacts HZ12 and FDL7. As the elevator car A leaves the high zone on the way down, the relay HZ drops out as does the relay FDL; however, the relay 81D will remain energized due to its delay in dropout until its holding circuit is established when contacts FD8 close.

Consider now the elevator car A in the high zone with an assignment to answer up demands in the low zone. Again the car must go down initially. The relay 81D is energized through the contacts HZ12 and FUL5. When the car A leaves the high zone the high zone relay HZ drops out, but the relay FUL does not drop out and therefore there is no holding circuit for 81D through the contacts 81D16 since the break contacts FU9 are open. However, when the high zone relay drops out, the break contacts HZ13 close. With the contacts FUL6 also closed, as long as the elevator car A is above the lowest up call in the low zone the relay UBL will be deenergized the relay 81D remains energized through the break contacts UBL5. When the floor selector of the elevator car A notches into the floor position at which the lowest up call in the low zone is registered, the relay UBL is energized thereby opening the contacts UBL5 and closing the contacts UBL4. Under these circumstances the relay 81U picks up after relay 81D drops out.

If the elevator car A is in the low zone and is assigned to down demands in the high zone the relay 81U will be energized initially through the contacts HZ13 and FDH6. The relay 81U will remain energized when the car reaches the high zone through the contacts HZ12, FDH5 and DBH4 until it reaches the highest down call. At this time the contacts DBH4 will open thus initiating high call reversal.

If the elevator car A is located in the low zone and is assigned to up calls in the high zone, the relay 81U is picked up through the contacts HZ13 and FUH8. The relay 81U remains energized when the elevator car A reaches the high zone through the holding contacts 81U15 since at this time the relay FUH drops out permitting closure of the break contacts FU8.

Assume next that elevator car A is located in the low zone and is asigned to up calls in the low zone. Under these circumstances the contacts HZ13 and FUL6 are closed. If the car is above the lowest up call the relay 81D will be energized to initiate downward movement of the car through the contacts UBL5. However, if the car is below the lowest up call in the low zone, the relay 81U will be energized through the contacts UBL4 to start the car moving upward. The relay FUL will then be deenergized and 81U will be held in by holding contacts 81U15.

If the elevator car A is in the low zone and is assigned to down demands in the low zone, the contacts HZ13 and FDL8 are closed. If the car is below the highest down call in the low zone, the up preference relay 81U is activated through the contacts DBL4 until the floor at which the highest down call is registered is reached at which time the contacts DBL4 open dropping relay 81U which in turn initiates high call reversal. If on the other hand, the elevator car A is above the highest down call in the low zone, the down preference relay 81D is energized through the contacts DBL5. Since energization of the relay 81D deenergizes the relay FDL, the down preference relay remains energized through its holding contacts 81D16.

It will be remembered from the previous discussion that during up peak traffic conditions it is desirable to return cars to the first floor rather than have them remain available at higher floors. Under these conditions the make contacts HCR1 of the high call return relay are closed as are the break contacts 1FL13 of the main floor relay so that 81D will be energized to initiate downward movement of the car to the first floor. When the A car floor selector notches into the first floor, contacts 1FL14 will open to initiate the stopping sequence.

When the elevator car A has been assigned to the main floor the down preference relay 81D is energized through the make contacts 87–6 to initiate downward movement of the car. It will be remembered that the relay 87 cannot be energized when the elevator car is in the basement so that the car must always go down if it is assigned to the main floor. When the main floor is reached the contacts 1FL14 open deenergizing the relay 81D and thereby initiating the stopping sequence.

If the elevator car A is assigned to the basement, the down preference relay 81D is energized through the make contacts 79–7. Since the make contacts 79–8 also close upon assignment of the elevator car A to the basement, the relay 81D is not deenergized by opening of the contacts 1FL14 when the A car floor selector notches into the main floor position. However, when the carriage of the floor selector for the elevator car A notches into the basement position, the relay 79 is deenergized thus opening the make contacts 79–8. Since at the same time the contacts 0FL8 open, the down preference relay 81D is denergized. If there are demands registered, the elevator car A does not become available and hence the break contacts AV7 remain closed. Since the make contacts 0FL7 are closed indicating that the elevator car A is in the basement the up preference relay 81U will be energized which initiates return of the car A to the first floor. If there are no car calls registered in the elevator car A it will stop at the main floor as explained in FIG. 2.

OPERATION

From the drawings illustrating the invention and from the foregoing description, in which the figures of the drawings are discussed in detail, it is possible to trace the operation of the elevator system in response to various demands of elevator service. Because of the complexity of the system, however, it will be helpful at this stage to describe a number of representative operations thereof. In order to simplify the presentation, the opening or closure of certain contacts upon pickup or dropout of the associated relay, soleniod or switch will not be discussed if such contact operation has no immediate or prospective effect upon the conditions then being considered. It should be remembered that although the components associated with the C car are generally not shown in the drawings, the operation and function of the C car components referred to in the following discussion are the same as the components associated with the A car bearing the same reference character except for the prefix C. Since many of the components necessary to make the system operational are identical to those used in our prior patent, operating steps involving these components will not be described in detail here.

For purposes of illustration, assume that the busses L1 and L2 are energized and that the manual motor generator switches MGS, BMGS, and CMGS are all closed so that the respective motors 17, B17 and C17 of the motor generator sets may be activated (see FIG. 1). Furthermore, assume that all of the cars are located at the main floor (relays 1FL, B1FL and C1FL, FIG. 5 energized). In addition, assume that the A car has been selected as the next car (relay N in FIG. 6 energized—the master next car relay in FIG. 6 will also be energized), and that the first dispatching interval has expired (relay U1T in FIG. 7 deenergized). Under these conditions the doors of the elevator car A will be open while those of the cars B and C will be closed.

Assume that a passenger enters the elevator car A and presses the car call button for the fourth floor (button 4C in FIG. 3). Although the call registering circuit for the fourth floor is not shown in FIG. 3, it is similar to the circuit shown for the second floor. Depressing of the button 4C results in energization of the car call registration relay 4CR causing the contacts 4CR2 in FIG. 10 to close. Closure of these contacts completes the circuit for energization of the car call above relay 38R. A detailed explanation of the operation of the circuit may be found in the description of FIG. 10. Energization of the relay 38R results in the closing of its make contacts 38R1 found in the circuit of the main floor starting relay illustrated in FIG. 1. Assuming that the non-interference time has also expired (break contacts 70T1 closed), the main floor starting relay SS for the elevator car A is energized through the following circuit since the A car is designated the next car to be dispatched at the main floor (make contacts N1 and 1FL1 closed):

L1, N1, U1T1, 70T1, 38R1, 1FL1, SS, L2

Energization of the relay SS results in the closing of its holding contacts SS1. Contacts SS2 also close thereby completing a circuit to energize the second auxiliary running relay 80 while the break contacts SS3 shown in FIG. 6, open to deactivate the next car relay N. Energization of the main floor starting relay SS also results in closing of the contacts SS4 and SS5 shown in FIG. 7 which recycle the dispatching interval relays U1T and U2T. Deenergization of the relay N results in the closure of the break contacts N11 shown in FIG. 9 which initiates door closing. Since the door closing circuits utilized herein are similar to those used in the prior patent reference should be made to that patent for a detailed description of this operation.

At the same time that the relay 38R is energized by the closing of the contacts 4CR2, the up preference relay 81U and the auxiliary running relay 81 are also energized (see FIG. 10). Energization of the relay 81 is ineffective at this time, however, since dispatching of the next car from the main floor is controlled by the main floor starting relay SS (break contacts N3 in FIG. 1 prevent the closing of the 81-1 contacts from activating the second auxiliary running relay 80 when the car call button is first depressed). Energization of the relay 81U however results in closing of the contact 81U1 shown in FIG. 1 thus preparing the elevator car A for upward travel. Since, as just discussed, the second auxiliary starting relay 80 was energized through contacts SS2, the contacts 80-1 will be closed and when the doors of the car are fully closed (relay DS in FIG. 9 energized) the contacts DS1 will close thus completing a circuit for energization of the running relay M and the up switch U. Energization of these relays will result in the upward movement of the elevator car A as described in our prior patent. As the elevator car A moves away from the first floor the relay 1FL is deenergized (FIG. 5) resulting in the opening of the contacts 1FL1 and the deenergization of the relay SS.

At the time that the elevator car A loses its designation as the next car, the next car circuits illustrated in FIG. 6 are effective to designate the B car as the next car in a manner similar to the operation of the next car circuits in our prior patent.

As the floor selector of the elevator car A notches into the fourth floor position, the car call stopping relay T (shown in FIG. 3) will be energized through the following circuit:

L1, 4CR1, g4, gg, 81U6, T, M5, L2

Energization of the relay T is effective to close the make contacts T1 thus energizing the inductor slow down relay E and the inductor stopping relay F shown in FIG. 1. The stopping sequence is then identical to that utilized in our prior patent. After the doors have opened and the passenger has left the car, the doors of the elevator car A will close as in our prior patent upon the expiration of a non-interference time (dropout of the relay 70T shown in FIG. 1).

Under the conditions described above the elevator car A will become available when the car doors are within a few inches of closing (relay DA in FIG. 9 activated closing the make contacts DA2 in FIG. 3). The circuit for the available car relay is shown in FIG. 3. Since the non-interference time must expire before the doors can close, the contacts 70T3 are closed. Furthermore, the contacts 87–2, 79–4 and 0FL2 are all closed. In addition, since the relay 81U is held in through its holding circuit (see discussion above of FIG. 10), the contacts 81U7 remain closed, however, the break contacts 38R3 are also closed because upon cancellation of the car call in a manner similar to that utilized in our prior patent, the relay 38R in FIG. 10 is deenergized. The final condition for availability, that there be no up corridor calls ahead of the car in the low zone, and no up corridor calls in the high zone which have been given preference, is also met by the A car (relay 78UU FIG. 5 energized thereby closing make contacts 78UU2). Under these conditions then, the available car relay AV will be energized through the following circuit:

L1, FU4, FD4, 38R3, 81U7, 78UU2, 70T3, DA2,
M7, 87–2, 0FL2, 79–4, AV, L2

Energization of the relay AV results in closing of the holding contacts AV3 which are necessary because it can be seen by referring to FIG. 10 that the holding circuit for the relay 81U is broken by the opening of the contacts AV8. The elevator car A will then remain at the fourth floor with its doors closed as an available car. Neither the up preference relay 81U nor the down preference relay 81D will be energized under these conditions.

It can also be seen from FIG. 3 that the elevator car A will be designated as the low zone available car (relay ALZ energized) since the car is not in the high zone (break contacts HZ3 closed), is not at the first floor (break contacts 1FL6 closed) and no other car has been designated as the low zone available car (break contacts MALZ1 closed).

When the elevator car B was designated as the next car its doors were opened as is evident from the circuits of FIG. 9 and as explained in our prior patent. Assume now that several passengers enter the elevator car B and that car calls are registered for the second and third floors. The elevator car B will be dispatched from the main floor by the main floor starting relay BSS in a manner similar to that in which the A car was dispatched. Also similar to the operation of the A car, the up preference relay B81U will remain energized when the B car stops for the car call at the second floor. The B car will not become available, however, when the car doors close after discharging a passenger at the second floor. This is so because with a car call still registered for the third floor, the relay B38R remains energized and hence its contacts B38R3 prevent energization of the relay BAV (FIG. 2). When the doors close after the passengers have been discharged at the third floor, however, the car will become available in a manner similar to that in which the A car became available. Thus, the relay BAV will be energized. The B car cannot become the low zone available car, though, since the A car has already been so designated. When the A car is designated as the low zone available car its contacts ALZ3 complete a circuit for energization of the relay MALZ (see FIG. 6). Energization of this relay results in the opening of the contacts MALZ2 in FIG. 3 thus preventing energization of the relay BALZ and designation of the B car as a low zone available car. However, since the B car cannot be designated as the low zone available car its break contacts BALZ2 are closed and through the now closed contacts MALZ4 the high zone available car relay BAHZ may be activated through the break contacts MAHZ2 since no other car has been designated as the high zone available car. Observe that now we have the A car at the fourth floor designated as the low zone available car and the B below it at the third floor designated as the high zone available car.

Upon the departure of the B car from the main floor the C car is selected as the next car. Suppose that a passenger now enters the C car and presses the car call button for the seventh floor (relay C7CR energized, see FIG. 3). (The circuits for the C car though not shown are similar to those for the A and B cars.) In a manner similar to that in which the other two cars were dispatched from the main floor, the C car will depart the first floor upon the activation of the main floor starting relay CSS. When the car C loses its next car designation, opening of the contacts CN8 (FIG. 6) will result in deactivation of the master next car relay MN. Since the mechanism for selecting the next car will always seek out any car at the first floor, failure of the mechanism to select a next car indicates that there are no cars at the first floor. Under these conditions it is desirable to create a false demand for service at the main floor so that one car will always be available for passengers entering the building. Referring to FIG. 6, deactivation of the relay MN closes the break contacts MN6 resulting in activation of the main floor demand relay MFD if the system is not operating under down peak conditions (contacts ID3 closed), no car has been assigned to the main floor (contacts M87-1 closed) or the basement (contacts M79-1 closed) and there is no basement demand (contacts 0FD1 closed). Activation of the MFD relay results in closing of its contacts MFD1 in FIG. 7. Since there are no other demands in the system the main floor demand is given preference by activation of the MFDA relay through the following circuit:

L1, ID4, UDLA1, 1D7, UDHA2, DDHA1, DDLA3, MFD1, MFDA, L2

Referring now to FIG. 9, energization of the relay MFDA results in closing of the make contacts MFDA1, MFDA2 associated with the A car, MFDA3 associated with the B car and MFDA4 associated with the C car (not shown). The circuit of FIG. 9 will now seek out one of the cars in the system and assign it to the main floor by energization of its 87 relay. Since none of the cars are at the first floor or at the basement, the 1FL11 and 0FL5 contacts associated with each of the three cars will all be closed. In addition the contacts MN5, MN6 and MN7 will also all be closed. Since there is no non-next car or next car and no car as yet has been assigned to the main floor, the circuit will seek out next the low zone available car. As it will be remembered from the discussion above, the A car has been designated as the low zone available car, hence the contacts ALZ6 are closed thereby completing a circuit for energization of the 87 relay of the A car. It should be remembered that the break contacts MALZ7 of the master low zone available car relay are open so that the B car, which it will be remembered has been designated as the high zone available car (contacts BAHZ6 closed), cannot have its relay, B87, energized. Energization of the 87 relay results in closing of its make contacts 87-3 to provide energization for the master main floor assignment relay M87 (see FIG. 7). Energization of the M87 relay results in opening of its break contacts M87-1 in FIG. 6 to deenergize the main floor demand relay MFD. This results in deenergization of the relay MFDA in FIG. 7. Closing of the contacts 87-6 in FIG. 10 establishes a circuit for energization of the down preference relay 81D and the auxiliary running relay 81 as follows:

L1, 87-6, 81U16, 1FL14, 0FL8, 81D, 81, L2

Energization of the 81 relay causes its make contacts 81-1 in FIG. 1 to close to provide a circuit for energization of the second auxiliary running relay 80 through the closed contacts N3 (since the A car is not the next car). From the discussion above it will be evident that the A car will depart the fourth floor for the main floor. When the relay 87 was energized its break contacts 87-2 (FIG. 3) opened so that the available car relay AV was deenergized permitting the contacts AV8 in FIG. 10 to close. Energization of the relay 81D resulted in closing of the holding contacts 81D16 and since the A car has not been assigned to down demands or up demands, relay 81D will remain energized through the following holding circuit:

L1, AV8, FD8, FU9, 81D16, 81U16, 1FL14, 0FL8, 81D, 81, L2

When the floor selector of the elevator car A notches into the first floor position, the break contacts 1FL14 open thereby deenergizing the 81D relay. This results in closing of the contacts 81D5 in FIG. 2, and since the contacts D6 remain closed until the car approaches the floor level, the 438 relay for the A car will be energized to initiate stopping of the elevator car A at the first floor.

When the elevator car A loses its designation as the low zone available car, the contacts ALZ3 open thus deenergizing the master low zone available car relay MALZ (FIG. 6). Deenergization of this relay results in the closing of the contacts MALZ2 and opening of the contacts MALZ4 in the availability circuits for the B car (see FIG. 3). It will be remembered that the B car, located at the third floor, was designated as the high zone available car by energization of its relay BAHZ through the following circuits:

AV4, BHZ3, B1FL6, BALZ2, MALZ4, BAHZ1, AHZ, L2

Opening of the contacts MALZ4 interrupts this circuit. Closing of the contacts MALZ2, however, is effective to redesignate the B car as the low zone available car by energization of the relay BALZ through the following circuit:

— —, BAV4, BHZ3, B1FL6, MALZ2, BALZ, L2

Although this will result in energization of the relay MALZ thus opening the contacts MALZ2 the relay BALZ will remain energized through its holding contacts BALZ1. The contacts BALZ2 will also open to prevent energization of the relay BAHZ. The B car then, which had been designated as the high zone available car although it was located in the low zone since it was the second car to become available in the low zone, is redesignated as the low zone available car when original low zone available car, A, is returned to the main floor.

It will be remembered that the C car has departed the main floor in the upward direction to satisfy a car call registered for the seventh floor. It will be observed from FIG. 9 that when the floor selector of the elevator car C notches into the fifth floor position the brush Crr will come into contact with the contact segment Cr5. This will result in energization of the high zone relay CHZ through the closed contacts of the up preference relay C81U14. The relay CHZ will remain energized through the holding contact CHZ11 as long as the car C remains in the high zone.

As the floor selector of the elevator car C notches into the seventh floor position, the car call stopping relay CT in FIG. 3 is energized. For a detailed description of the energization of this relay refer to the discussion of FIG. 3. As the elevator car C approaches the level of the seventh floor, the mechanical switch 31 in FIG. 5 will open to deenergize the top floor relay TFL. Deenergization of this relay will result in the opening of the contacts TFL2 in FIG. 10 which interrupts the circuit for the up preference relay 81U. After the passenger has disembarked at the seventh floor and the doors of the car have closed, the available car relay CAV will be activated through the contacts CTFL1 if no has registered down car calls in the C car (make contacts C38D1 closed). Closing of the contact CAV4 completes a circuit for the energization of high zone available car relay CAHZ through the contacts CHZ4 of the high zone relay and break contacts MAHZ3 of the master high zone available car relay in FIG. 3 (the relay MAHZ was deenergized when the B car was redesignated as the low zone available car).

CREATION AND SATISFACTION OF DEMANDS FOR SERVICE

As a result of the above operations, the cars become distributed throughout the shaft awaiting demands for service. The A car located at the main floor becomes the next available car, the B car at the third floor is the low zone available car and the C car at the seventh floor is the high zone available car. Assume now that a prospective passenger at the sixth floor presses the down corridor call button 6D thus energizing the down call registering relay 6DR (see FIG. 2). Energization of this relay results in the opening of the contacts 6DR2 in FIG. 4 which deenergizes the relay DCH indicating that a down corridor call has been registered in the high zone. This causes the contacts DCH1 in the circuit of the down demand in the high zone relay DDH of FIG. 6 to close. Since the C car is available in the high zone (contacts CHZ6 and CAV5), since none of the cars have been assigned to down demands in the high zone (contacts FDH2, BFDH2 and CFDH2 all closed), and since none of the cars are conditioned for down travel (contacts 81D8, B81D8 and C81D8 all closed), the relay DDH will be energized thereby registering a down demand for service in the high zone. Returning to FIG. 7, the demand will be given preference by energization of the relay DDHA through the contacts DDH4. One of the three cars will be assigned to answer this demand through the circuits of FIG. 8. With the contacts DDHA2, 3, 4 and 5 (not shown) closed, the C car will be assigned to the demand by energization of the relay CFDH (not shown) through the contact CAHZ4 (not shown). Neither the relay FDH nor BFDH can be energized although the contacts AN2 and BALZ4 are closed because the contacts MAHZ5 are open. Assignment of the C car to the demand for service results in closing of the contacts CFDH5 (not shown) in FIG. 10. The contacts CHZ12 will be closed since the C car is located in the high zone. The contacts CDBH5 will also be closed since it is evident from an inspection of FIG. 4 that with the brush C*ll* of the floor selector of the C car in contact with the segment C*l6*, the relay CDBH will be energized. A circuit is then completed in FIG. 10 for energization of the relays 81D and 81 to initiate downward movement of the elevator car C. Energization of the relay C81D results in opening of the contact C81D11 (not shown) in FIG. 8 which deenergizes the down demand in the high zone assignment relay CFDH. Initial assignment of the C car to the down demands in a high zone cause the contacts CFDH2 in FIG. 6 to open thus cancelling the down demand in the high zone. The reclosing of these contacts upon dropout of the assignment relay will not result in reenergization of the relay DDH because a closed circuit no longer exists between them and the relay DDH. With the C car set for down travel the contacts C81D8 are open. Since the C car has not been assigned to down demands in the low zone nor to up demands the contacts CFDL3 and CFU5, respectively will also be open. As was stated previously the relay CDBH is also energized so that the contacts CDBH3 are open thereby preventing energization of the relay DDH. Car C will now proceed down and stop at the sixth floor in a manner which will be evident from the previous discussion.

Assume that a passenger enters the car at the sixth floor and presses the button C1C registering a car call for the first floor. Assume further that at this point a prospective passenger at the third floor pushes the button 3D thus registering a down corridor call at the third floor. It will be remembered from the prior discussion that the elevator car B designated as the low zone available car is located at the third floor with its doors closed. The available car B will not be assigned to answer this call, however, because a down demand for service in the low zone will never be registered. This will occur because the relay DDLC in FIG. 6 will be energized thereby preventing energization of the relay DDL also shown in FIG. 6. Relay DDLC is energized through the circuits associated with the C car. Since the C car is conditioned for down travel, the contacts C81D9 are closed. Since it has not been assigned to up demands, the contacts CFU6 are closed. Furthermore, the C car is still in the high zone so the contacts CHZ7 are closed. With reference to FIG. 5 it will be seen that the contacts C7DD4 will also be closed with the C car located at the sixth floor as long as no down call is registered at the fifth floor (contacts 5DR3). Hence it can be seen that even though the B car was available for service and was designated as the low zone available car and, furthermore, that it was located at the floor at which the down corridor call was registered, the B car was not assigned to answer that down call because the C car was in position to serve the call. If the B car had been assigned to answer the down call at the third floor, all of the cars could have ended up back toward the main floor. Since the C car can take care of the calls shortly it is better to have the B car remain available above the first floor for any future demands.

When the floor selector of the C car notches into the fourth floor position, the highest floor in the low zone, the cam CS will open the switch C23 thereby deactivating the relay CHZ (see FIG. 9). This will result in the opening of the contacts CHZ7 FIG. 6. However, by reference to FIG. 4 it will be seen that the relay CDBL will be energized thereby maintaining energization of the relay DDLC in FIG. 6 through the contacts CDBL3. The elevator car C will then stop at the third floor in response to the down corridor call registered.

Figure 8:
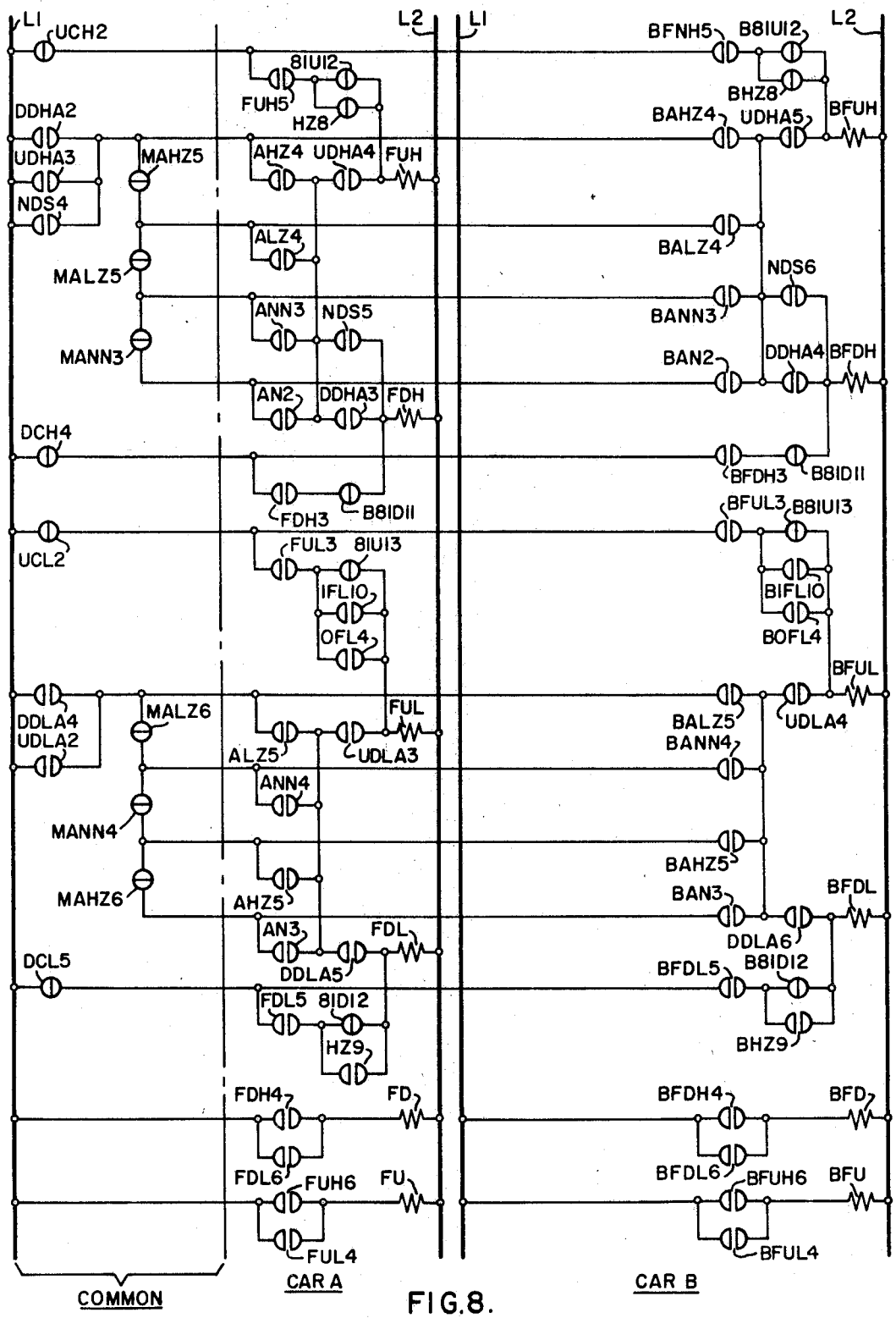

Assume now that an up corridor call is registered at the third floor (relay 3UR of FIG. 2 energized). This is the floor, it will be remembered, at which the B car, designated as the low zone available car, is standing with its doors closed. Opening of the contacts 3UR2 in FIG. 4 results in deenergization of the relay UCL thus indicating that an up call has been registered in the low zone. Dropout of the relay UCL causes the contacts UCL1 in the circuit of the up demand in the low zone relay UDL shown in FIG. 6 to close. Since no car has been assigned to up demands in the low zone, contacts FUL2, BFUL2 and CFUL2 are all closed. Furthermore, since none of the cars are traveling in the up direction contacts 81U9, B81U9 and C81U9 are all closed also. Thus, a circuit is completed for energization of the relay UDL. The up demand in the low zone is given preference by energization of the relay UDLA in FIG. 7 through the contacts UDL4. Referring to FIG. 8, the closing of the contacts UDLA2 and UDLA4 results in energization of the relay BFUL through the contacts BALZ5 since it will be remembered that the B car had been designated as the low zone available car. Assignment of the B car to the up demand in the low zone results in the closing of the contacts BFUL1 in FIG. 2. With the B car at the third floor the contacts BUBL1 of FIG. 2 will also be closed since the following circuit is provided in FIG. 4 for energization of the relay BUBL:

L1, 2UR2, B$k$3, B$kk$, BD6, BUBL, L2

Furthermore, with the B car at the third floor, the brush B$aa$, is in contact with the segment B$a$3 (see FIG. 2), and since the B car is available (contacts BAV1 closed), the relay B438 is energized through the following circuit:

L1, 3UR1, B$a$3, B$aa$, BFUL1, BUBL1, BAV1, BD2, BLW2, B438, L2

Energization of the relay B438 closes the contacts B438-3 in FIG. 9 which together with contacts BAV6 complete a circuit momentarily energizing the relay B42. In a manner which will be evident from the prior patent, energization of the relay 42 initiates door opening of the B car. When the relay BFUL in FIG. 8 was energized its contacts BFUL4 provided a circuit for energization of the relay BFU. This relay will open its contacts BFU4 in FIG. 3 to deenergize the relay BAV thereby indicating that the B car is no longer available for assignment. Since the contacts BFUL6 and BUBL4 in FIG. 10 are both energized the relay B81U is also energized. Since the elevator car B is not yet moving (contacts BM4 still closed) the following circuit shown in FIG. 2 is completed to cancel the up corridor call at the third floor:

L1, 3UR1, 3URN, B$b$3, B$bb$, B81U3, BAV2, BM4, L2

Assume that several people enter the elevator car and register up car calls for several floors including the seventh floor. The elevator car B will then move upward in response to the car calls.

From the above described conditions then the B car is traveling up in response to car calls. Assume that it enters the high zone the C car, it will be remembered, is descending in the low zone. Assume further that the A car is now dispatched in the up direction from the first floor in response to a car call for the seventh floor.

If a down corridor call is now registered at the fifth floor, it will become apparent from an inspection of the circuits of FIG. 6 that a down demand in the high zone will be created. The contacts DCH1 will be closed indicating that a down call in the high zone has been registered (see FIG. 4). Since no car is assigned to down demands in the high zone contacts FDH2, BFDH2 and CFDH2 will all be closed. Furthermore, the contacts 81D8 and B81D8 will both be closed since the A car and the B car are both traveling in the up direction. Although the contacts C81D8 of the C car are open the contacts CDBH3 will be closed since the C car is not in the high zone (see FIG. 4). Since the B car is traveling up in the high zone, the contacts MHU1 will be open (see the circuit for the relay MHU in FIG. 6). However, since there are no down calls registered in the low zone the relay DCL in FIG. 4 will be energized thus completing a circuit in FIG. 6 for energization of the relay DDH through the contacts DCL1. Energization of the relay DDH will result in energization of the relay DDHA in FIG. 7 through the contacts DDH2. Although the down demand in the high zone has preference there are no cars available for assignment.

Suppose now that a down corridor call is registered at the fourth floor which of course is in the low zone and that the C car is below the fourth floor on the way to the main floor. Registration of this call will result in cancellation of the down demand in the high zone. It will be remembered from the discussion immediately above that energization of the relay DDH was achieved through the closed contacts DCL1. With the down call now registered in the low zone the contacts DCL1 will be open. If the B car is still traveling up the high zone the contacts MHU1 will remain open. Since no cars are available in the high zone the only other path between the contacts DCH1 and FDH2 in FIG. 6 would be through the contacts DDLC1. The relay DDLC, however, will not be energized. This is true because no car has been assigned to down demands in the low zone and although the C car is traveling down in the low zone (contacts C81D9 closed), and is not assigned to up demands (contacts CFU6 closed), the down corridor call in the low zone is behind the C car (contacts CDBL3 open).

To aid in understanding why the down demand in the high zone is cancelled, a brief analysis of the traffic situation is in order. It will be remembered that the A car is traveling up in the low zone in response to a car call at the seventh floor. Likewise, the B car is traveling up in the high zone in response to a car call for the seventh floor, while the C car is traveling down in the low zone approaching the main floor. In addition down corridor calls are registered in both the high zone and the low zone. Normally when a down demand is registered in both the high zone and the low zone, down demands in the high zone are given preference since the car serving the down demands in the high zone may then serve the down demands in the low zone on the way down if they have not been taken care of in the meantime. In the situation described above, however, the system will anticipate that the B car traveling up in the high zone will become available shortly. In that case the down demand in the high zone is cancelled thereby giving the down demand in the low zone preference so that the low zone calls can be served by another car if one is available or becomes available before the car traveling up in the high zone is in position to serve the down demand in the low zone.

Assume now that the C car stops at the first floor discharges its passengers, and becomes available. The C car will then be assigned to answer the down demand in the low zone in acocrdance with the operations described above. Assignment of the elevator car C to the down demand in a low zone will result in the reestablishment of the down demand in the high zone since the relay DDLC will now be energized through the contacts CFDL4 (see FIG. 6). When the elevator car B reaches the seventh floor, discharges its passengers and becomes available, it will then be dispatched to serve the down demand in the high zone.

Assume at this point that an up corridor call is registered at the fifth floor, and furthermore that the elevator car A has passed the fifth floor proceeding in the upward direction to serve its car call at the seventh floor. Registration of the up call at the fifth floor results in the opening of the contacts 5UR2 in FIG. 4. thereby deenergizing the relay UCH. Consequently, the contacts UCH1 in the circuit of the UDH relay shown in FIG. 6 close and since no car has yet been assigned to up demands in the high zone the contacts FUH4, BFUH4 and CFUH4 are all closed. Since the car B is traveling down the contacts B81U10 are also closed. The contacts UBH3 and CUBH3 are also closed, the latter because the C car is in the low zone and the former because the A car is above the up call (see FIG. 4). With the relay UDH energized, contacts UDH4 in FIG. 7 complete a circuit for the energization of the relay UDHA. In other words, the up demand in a high zone being the only demand registered is given preference.

If an up call is now registered at the fourth floor (contacts 4UR2 in FIG. 4 open), an up call in the low zone will be registered by deenergization of the relay UCL. This causes the contacts UCL1 in the circuit of the UDL relay shown in FIG. 6 to close. Since no car has been assigned to up demands in the low zone the contacts FUL2, BFUL2 and CFUL2 are all closed. Since the A car is in the high zone the contacts UBL3 are also closed. Since the B car is traveling down the contacts B81U9 are closed and since the C car is assigned to down demands in the low zone the contacts CFD5 are closed. Energization of the relay UDL, indicating that an up demand has been created in the low zone, causes the contacts UDL4 in FIG. 7 to close. A circuit is then created for energization of the relay UDLA thereby giving the up demands in the low zone preference. Opening of the contacts UDLA1 deenergizes the relay UDHA thereby stripping the up demands in a high zone of their preference.

Consider now that the A car discharges its passengers at the seventh floor and becomes available. As will be evident from the above discussion the A car will be designated as the high zone available car. From FIG. 8 it can be seen that since the contacts UDLA2 and UDLA3 are closed and since there is no low zone car and no nonnext available car, the A car will be assigned to the up demand in the low zone by energization of the relay FUL through the contacts AHZ5. The circuits described in the detailed description of FIG. 10 are then effective to initiate movement of the elevator car A toward the fourth floor. It should be observed that although the A car is located in the high zone or was designated as the high zone available car, it was assigned to up demands in the low zone even though there was a demand for service existing in the high zone. This is but one example of the flexibility of the system and in particular its ability to accommodate to the existing traffic situation.

BASEMENT SERVICE

In the sequence of events described above, when the C car departed the main floor, the master next car relay MN of FIG. 6 was deenergized thus indicating that no cars remained at the main floor. No main floor demand would be created however, because by referring to FIG. 9 it can be seen that the system would sense that the B car which is traveling down (contacts B81D13) and is not assigned to up demands (contacts BFU7 closed), is in position to be assigned to the main floor through energization of the relay B87 as described in the detailed discussion of FIG. 9. Relay B87 will remain energized through the holding contacts B87-5. Closing of the contacts B87-3 energizes the relay M87 in FIG. 7 which in turn prevents registration of a main floor demand in FIG. 6 (by energization of the relay MFD) through the opening of the contacts M87-1.

Assume that a passenger who boarded the B car at the fifth floor depresses the car call button B0C indicating a desired to be transported to the basement. At the time that this button is depressed the contacts B0CR3 in the circuit of the basement assignment relay B79 in FIG. 9 close as do the contacts B81D14 indicating that the B car is set for down travel. However, the relay B79 is not energized at this time since the contacts BHZ10 are open, indicating that the car B is still in the high zone. A car in the high zone with a basement car call registered will not be assigned to the basement as long as it remains in the high zone for the reason that if a person in the basement desires up service or a person at the main floor desires service down to the basement he would very likely have an excessively long wait for the car which was then in the high zone. By not assigning the car with a basement car call registered to the basement while it remains in the high zone, a basement demand can be created and another available car assigned to that demand thereby expediting service. However, if no other car becomes available before the car in the high zone enters the low zone, it will be assigned to the basement demand and nothing has been lost. Hence in the example being described, when the B car enters the low zone the contacts BHZ10 will close and the elevator car B will be assigned to the basement by energization of the relay B79.

As the floor selector of the elevator car B notches into the first floor position, the contacts B1FL14 in FIG. 10 will open. However, the down preference relay B81D will remain energized to continue the downward movement of the elevator car B through the contacts B79-8. As the floor selector of the elevator car B notches into the basement position the contacts B0FL6 of FIG. 9 will open deenergizing the relay B79. This will cause the contacts B79-8 in FIG. 10 to open and since the contacts B0FL8 are also open, the relay B81D will be deenergized Dropout of the relay B81D causes the contacts B81D5 in FIG. 2 to close thereby completing a circuit through the contacts BD6 to energize the stopping relay B438. The B car will therefore come to a stop at the basement floor in the manner described previously.

Referring to the circuit for the relay BAV in FIG. 3 and remembering that an up demand for service in the high zone is registered, the B car will become available in the basement. Witth the B car in the basement the make contacts B0FL1 and B0FL3 of the basement relay are closed while the contacts B0FL2 are open. With the contacts B0FL3 closed cars are considered to have completed the trip in the basement if there are no car calls registered for floors above (contacts B38R3 closed). Closing of the contacts B0FL1 and opening of the contacts B0FL2 impose the further requirement for availability that a demand for service exist and that either the system is operating under down peak conditions, or there be a car at the main floor. Applying this to the situation at hand, since there is an up demand registered in the high zone the contacts UDH2 are closed and assuming that by this time the C car, which it will be remembered was also traveling down, has reached the main floor, the contacts MN2 of the master next car relay will be closed. When the doors of the elevator car B close (make contacts BDA2 closed) after the interference time has expired (contacts B70T3 closed), the relay BAV will be energized thus indicating that the B car is available for assignment. Through the closing of the contacts BAV4 the elevator car B will become the low zone available car by energization of the relay BALZ in a manner described in the detailed description of FIG. 3. Since the up demand in the high zone is the only demand registered, the B car will be assigned to this demand by energization of the relay BFUH through the circuits illustrated in FIG. 8. The B car will then depart the basement for the fifth floor.

Assume now that the elevator car C becomes available at the main floor. Assume further that a prospective passenger depresses the button 1D at the first floor thus indicating a down corridor call at the first floor.

Closing of the contacts 1DR2 results in energization of the basement demand relay 0FD in FIG. 6 since the system is not on down peak nor is any other car assigned to the basement (contacts 1D3 and M79–1 closed). The basement demand will be given preference by energization of the relay 0FDA in FIG. 7 through the contacts 0FD2. Energization of this relay results in closing of the contacts 0FDA1 through 4 in FIG. 9. Since there is no non-next car available the system will seek out the next available car to assign to the demand for basement service. The C car has been designated as the next available car, therefore the relay C79 (not shown) will be energized through the following circuit:

L1, 0FDA1, MANN5, CAN4, 0FDA4, C0FL6, C79, L2

FIG. 10 (not shown) and C79–8 to complete a circuit for Pickup of the C79 relay closes the contacts C79–7 in energization of the relay C81D and C81. When the relay C79 is first energized, it is held in by the contacts C79–6 and the non-interference relay C70T5. This is necessary since energization of the relay C79 results in cancelling availability of the C car. If a person desiring to travel to the basement enters the car and depresses the car call button for the basement (C0C) before the non-interference time expires (before the contacts C70T5 open) the relay C79 will remain energized through the contacts C0CR3 and C81D14 since, as was just mentioned, the latter relay was energized by the C79 relay. Since the C car is located at the first floor, the contacts CHZ10 are closed to complete the holding circuit. The C car will then depart the main floor for the basement. If a passenger does not enter the car and register a car call for the basement, C79 drops out when contacts C70T5 open and the car reverts to its original state.

As the floor selector of the elevator car C notches into the basement position, the relay C0FL in FIG. 5 is energized thereby opening the contacts C0FL6 and C0FL8. Opening of the contacts C0FL8 has no immediate effect upon the relays C81D and C81 because they remain energized through the contacts C79-8 (see FIG. 10). However, opening of the contacts C0FL6 in FIG. 9 results in deenergization of the relay C79. Opening of the contacts C79-8 in FIG. 10 results in deenergization of relays C81 by energization of the relay C438 in FIG. 2 through the contacts CD6 and C81D5.

As the car comes level with the basement floor the doors will open in a manner described previously. Since it will be remembered that there are no demands registered at this time, the C car cannot become available in the basement. This is true because in the circuit for the available car relay shown in FIG. 3, when the contacts C0FL1 close and C0FL2 open there must be a demand for service in order to complete the circuit for energization of the relay CAV. It should be observed in passing that even if there was a demand for service registered the C car could still not become available in the basement since the system is not operating on down peak (contacts CID1 open) and there is no car at the first floor (break contacts MN1 open). Since the elevator car C cannot become available the contacts CAV7 in FIG. 10 remain closed. Since the contacts C0FL7 are also closed, indicating that the car C is at the basement, the relays C81U and C81 are energized as soon as the relay C81D drops out (when break contacts C81D15 close). As will be obvious in view of the previous discussion, when the doors of the elevator car C close the circuits will be completed to initiate upward travel of the elevator car C.

Since the elevator car C did not become available in the basement, the contacts CFD3 and CFU3 in FIG. 2 must be closed because the car cannot be on assignment for up demands or down demands. Since the car is traveling up, the contacts C81U4 are closed. As the floor selector of the elevator car C notches into the first floor position the contacts C1FL3 will close. If no one entered the car in the basement and pressed an up corridor call (break contacts 38R2 closed) then the relay C438 will be energized and the C car will stop at the main floor.

UP PEAK

To summarize the existing traffic situation, the C car is now located at the first floor and becomes the next available car. Remember that the A car, which had been the high zone available car, has been assigned to an up demand created by an up corridor call at the fourth floor (low zone) while the B car has been assigned from the basement to serve an up demand created by an up corridor call at the fifth floor (high zone). Assuming that the A car descends to the fourth floor and admits the waiting passenger who presses the car call button for the sixth floor, and further assuming that the A car starts the upward trip from the fourth floor ahead of the B car, the A car will stop for the up corridor call at the fifth floor. The manner in which this is accomplished can be traced in FIG. 2. The contacts 81U2 will be closed as will the contacts FD2 and both the contacts HZ1 and FUH1. Therefore, as the floor selector for the elevator car A notches into the fifth floor position, the 438 relay will be energized and the A car will stop for the up corridor call. As the elevator car A comes to a stop, it will cancel the registered up corridor call at the fifth floor in the manner described previously. Cancellation of the up corridor call at the fifth floor results in the closing of the contacts 5UR2 in FIG. 4 thereby completing the circuit for energizing the up call in the high zone relay UCH. Energization of the relay UCH results in opening of the contacts UCH2 in FIG. 8 thereby deenergizing the relay BFUH and cancelling the assignment of the elevator car B to up calls in the high zone. Upon deenergization of the relay BFUH the contacts BFUH8 in FIG. 10 will open. The B81U and B81 relays will remain energized, however, because the contacts BFUN6 in FIG. 8 will also open thereby deenergizing the relay BFU. This results in closing of the break contacts BFU8 in FIG. 10 to establish a holding circuit for the relays 81U and 81. It will be recalled that the relay 81U has a time delay in dropout of sufficient duration to keep the relay picked up until the contacts BFU8 close. With the opening of the contacts BFU3 in FIG. 2, the stopping relay B438 is energized through the following circuit:

L1, B81D4, B78DD1, B38D1, B87-1, B79-3, NDR2, BFU3, BFD3, B438, L2

The car will then stop at the next floor. In other words if a car is proceeding on an assigned task and another car cancels the calls creating the demand, the assignment will be cancelled and the car will stop at the next floor. Assuming that the B car then comes to a stop at the third floor, under the conditions described it will become the low zone available car.

Turning now to FIG. 7, assume that a large group of passengers with a combined weight which exceeds 50% of the capacity of the elevator enter the car C at the first floor (make contacts C1FL9 closed) thereby closing contacts CPW1. If these passengers then depress car call buttons for floors above the first floor the contacts C81U11 will close. When the interference time expires the contacts C70T4 will close and when the dispatch interval expires and the doors begin to close, contacts C45-1 will be closed. As the heavily loaded C car leaves the first floor the relay NDR will be energized through the closed contacts ID11 since the system is not on down peak and through the contacts PT1 of the peak timing relay. Relay NDR remains energized through the holding contacts NDR5. Closing the contacts NDR4 completes a circuit through the charging resistor R3 for charging the timing capacitor C1. Since the tube TU1 will not conduct until the charge on the capacitor reaches a predetermined value, the relay PT remains deenergized and the relay NDR remains activated through the contacts PT1. As soon as the elevator car C loses its next car designation the relay MN will be deactivated and a main floor demand will be created by energization of the relay MFD in FIG. 6. The main floor demand will be given preference by energization of the relay MFDA in FIG. 7. As was described previously in connection with the C car, the B car will be assigned to return to the main floor by energization of the relay B87 in FIG. 9. Energization of this relay closes the contacts B87-5 in FIG. 10 to initiate downward movement of the B car as previously discussed.

Since the B car is assigned to the main floor, the master main floor assignment relay M87 of FIG. 7 is energized thereby preventing the registration of another main floor demand (the contacts M87-1) in the circuit of the MFD relay shown in FIG. 6 open). Under these conditions the elevator car A after becoming available at the six floor would remain there. However, with the system conditioned for up peak operation, the contacts HCR1 in FIG. 10 are closed, and since the car is not at the first floor the contacts 1FL13 are also closed. Under these conditions, the relay 81D will be energized as soon as the contacts 81U16 close upon dropout of the relay 81U. In addition, the relay 81 will be energized, which it will be remembered from the description of FIG. 1, will energize the second auxiliary starting relay 80 to initiate downward movement of the car. Therefore, the elevator car A is started down for the main floor despite the fact that there is no down demand registered.

DOWN PEAK OPERATION

To summarize the traffic situation, it will be remembered that the A car is traveling down with its relay 81D held in by the contacts HCR1. It will be further remembered that the B car is assigned to the main floor and is descending in the low zone, while the C car is traveling up serving car calls.

Assume that with the A car approaching the low zone that a down corridor call is registered at the third floor. By inspection of the circuits of FIG. 6 it will be understood that no demand in the low zone will be created since the A car is in position to serve the call. Car A will then stop at the third floor, as can be seen from the circuits of FIG. 2. While the car A is stopped at the third floor loading passengers, the relay 81D will remain energized through the holding circuit (contacts 81D16 in FIG. 10). Assume that a sufficient number of persons board the elevator car A at the third floor so that the load weighing switch LW is tripped closing the contacts LW3 in FIG. 7. Assume further that a down call is also registered at the fourth floor so that the contacts DCL4 in FIG. 7 are also closed. Since the contacts PT1 of the peak timing relay are closed, a circuit is completed for energization of the relay ID which conditions the system for down peak operation. It will be remembered that the system has been operating under up peak conditions, but opening of the contacts ID11 in FIG. 7 is given down peak operation priority over up peak.

If an up corridor call had been registered at the fifth floor prior to the energization of the relay ID, the up demand created in the high zone would have been given preference (see FIG. 7). However, when the system switches to down peak operation, down demands are given preference over up demands. This is accomplished in FIG. 7 by the opening of the contacts ID4, ID7 and ID8 and the closing of the contacts ID5 and ID6. Consequently, the down demand in the low zone created by the down corridor call at the fourth floor will be given priority over the up demand in the high zone by energization of the relay DDLA. If a down call is now registered at the seventh floor, a down demand in the high zone will be created. Normally the down demands in the high zone are given preference over down demands in the low zone. However, it will be remembered from the detailed discussion of FIG. 7 that during down peak operation preference is alternated between down calls in the high zone and the low zone. The first down demand to be registered is given preference. Here, a down demand was created in the low zone (contacts DDL4 closed) first. There was no demand in the high zone, hence, the contacts DDHA1 were closed and the relay DDLA was energized. This opens the contacts DDLA2 and since the system is set for down peak operation, the contacts ID8 are also opened so that a subsequently registered down demand in the high zone (contacts DDH4 closed) cannot assert priority.

If the elevator car B which it will be remembered was assigned to the main floor is now assumed to have reached the main floor and become available, it will be assigned to satisfy the down demand in the low zone. Assignment of the elevator car B to the down demand in the low zone (energization of the relay BFDL in FIG. 8) results in cancellation of the down demand in the low zone (contacts DDLC2 in FIG. 6 are opened since the relay DDLC is energized through the contacts BFDL4). Opening of the contacts DDL4 in FIG. 7 de-energizes the relay DDLA which in turn results in closing of the contacts DDLA2 thereby permitting the down demand in the high zone to be given preference through energization of the relay DDHA.

Assume that the elevator car C which is traveling up on car calls completes its last car call at the fourth floor and becomes available. The C car will be assigned to the down demand in the high zone by energization of the relay CFDH in FIG. 8. With the down demand in the high zone satisfied, the up demand in the high zone will now be given preference. Assuming that the elevator car A has discharged its passengers at the main floor, it will become available and be assigned to the up demands in the high zone.

To recapitulate then, the A car is serving up demands in the high zone, the B car is serving down demands in the low zone and the C car is serving down demands in the high zone. Assume that as the A car travels up to the seventh floor in response to a car call registered by the passenger who created the corridor call at the fifth floor, that the B car is descending to the main floor and that the C car after taking on the passenger who registered the down corridor call at the seventh floor is proceeding down approaching the low zone. Assume further that the A car becomes available at the seventh floor and that down calls are registered at the seventh, sixth and fifth floors. The A car will be assigned to serve the demand created by these corridor calls and the demand will be cancelled. If in the meantime the C car stops for a down call at the fourth floor and down calls are registered at the third and second floors there will be no down demand registered in the low zone. Since there are also no up demands registered, when the B car becomes available at the first floor it will have nowhere to go. To preclude having an available car stand idle during down peak conditions the relay NDS of FIG. 7 will be energized. Since there are no up demands registered the contacts UDL5 and UDH5 are both closed. In addition, since there are down calls registered in both the high zone and the low zone, the contacts DCH2 and DCL3 are also closed completing the circuit for energization of the relay NDS. It is not necessary to include contacts of the down demand relays in the NDS circuit since down demands are given preference during down peak conditions. With a down demand registered, the contacts DDHA1 or DDLA3 will be open precluding energization of the relay NDS.

Assume that the passengers who entered the car B depressed the button for the basement so that the car B completed its trip at the basement floor level. With the relay NDS energized, the contacts NDS2 in the available car circuit for the car B (FIG. 3) will be closed. Also since the system is operating on down peak the contacts ID2 in FIG. 3 will be closed so that the elevator car B can become available in the basement although there are no demands registered and there are no cars located at the first floor. Referring now to FIG. 8, the contacts NDS4 and NDS6 will be closed so that the relay BFDH will be energized thus indicating that the B car has been assigned to a simulated demand for service in the down direction in the high zone. The B car will then be dispatched from the basement floor in a manner obvious from the previous discussion and will proceed to the highest down call registered. Of course during this time the elevator car A is moving down serving car calls or if the elevator car A becomes fully loaded it will by-pass floors at which down calls are registered since the contacts LW2 in the 438 circuit shown in FIG. 2 will then be open. The B car will then proceed to the highest down call reverse and begin answering down corridor calls in the high zone. If the elevator car A does not become fully loaded before the elevator car B reaches the high zone, elevator car B will still proceed to the highest down corridor call that has not been taken care of by the A car. In this manner full emphasis is placed upon serving the down corridor calls during down peak conditions.

We claim as our invention:

1. A vehicle system comprising a structure having a plurality of spaced landings, a plurality of cars, means mounting the cars for movement relative to the structure to serve the landings, first-direction landing call registering means operable for registering a call for service in a first direction from each of a plurality of said landings, second-direction landing call registering means operable for registering a call for service in a second-direction from each of a plurality of said landings, availability means conditioning each of the cars in response to predetermined conditions to be an available car for answering calls registered by either of the call registering means, wherein the improvement comprises designating means operative to identify each of the available cars, said designating means being responsive to the position of the particular available care relative to the floors and the order relative to other available cars similarly positioned that the particular car becomes available, demand registering means effective to register a plurality of demands for service in response to predetermined conditions including registration of a call by the call registering means, assigning means for assigning an available car to the demands registered by the demand registering means, said available car to be selected from the designated available cars in a predetermined order determined by the particular demand, control means for initiating movement of an assigned car to satisfy the particular demand and direction conditioning means conditioning a car dispatched by said control means in a given direction to continue traveling in said given direction until its trip is complete or until it reaches a landing at which it must reverse direction in order to satisfy a call to which the car is assigned by the assigning means.

2. The system of claim 1 including means for changing the designation of a particular available car when a car which had become available at the same position relative to the landings prior to the particular car is no longer conditioned as an available car by the availability means.

3. The system of claim 1 wherein a plurality of the landings are grouped into a plurality of zones, each zone comprising at least one landing, wherein the designating means includes means for determining the position of the particular car relative to the landings in terms of said zones and means for associating a particular car with a particular zone, and wherein the demand registering means is also responsive to the zone in which a call is registered.

4. The system of claim 3 wherein said associating means associates the first car to become available in a first zone with that zone, wherein said associating means associates with another zone, a car which subsequently becomes available in said first zone while said first car is still associated with that zone as available, and wherein the car associated with another zone is redesignated as being associated with the first zone when a car which earlier became available in the first zone is no longer conditioned as available by the availability means.

5. The system of claim 4 wherein the demand registering means is effective to register a separate demand for service for each direction of travel within each zone in response to the registration of at least one landing call in the given direction within the given zone, and wherein the system includes demand preference means for selecting one of said demands at a time in a predetermined order to be satisfied by the assignment of an available car by said assigning means.

6. The system of claim 5 wherein said cars are elevator cars and said landings are vertically-spaced floors, said system including a main floor and a basement floor below the main floor, said basement and main floor comprising the two lowest floors in the structure, said system also including car call registering means for each of the elevator cars, each of the car call registering means being operable for registering a call for any of a plurality of landings which may be desired by load within the associated car, and wherein a car can be conditioned by said availability means as an available car when stopped at the basement floor provided that conditions including the following are met: (1) no car calls are registered by the car call registering means for the car and (2) demands for service are registered by said demand registering means.

7. The elevator system of claim 6 including means for sensing a predominant need for down elevator service and wherein there must be a car at the main floor for a car to become available at the basement unless said last-named means senses a predominant need for down elevator service, wherein a car which becomes available in the basement will be assigned promptly to satisfy a demand by said assigning means and wherein a car in the basement which is not available and is not assigned to a demand will be returned to the main floor by the control means or to floors for which car calls have been registered.

8. The system of claim 5 wherein said cars are elevator cars and said landings are vertically-spaced floors, said system including means within the demand preference means for varying the order in which the various demands are satisfied in accordance with variations in the traffic situation.

9. The elevator system of claim 8 including normally deactivated down peak traffic sensing means for conditioning the demand preference means to give down demands preference over up demands in response to the activation of the down peak traffic sensing means by the presence of a car conditioned for travel in the down direction which is loaded to capacity while a down floor call remains unanswered in at least one zone.

10. The system of claim 5 wherein the demand registering means will deny registration of a demand and cancel the registration of a demand for service already registered when said last-named means senses that a car in service meets either one of the following conditions: (1) it is in position or (2) it will soon be in a position, to satisfy the floor call tending to create the demand.

11. The system of claim 10 wherein a car is in position to satisfy a floor call tending to create a demand for service in a first direction in a given zone when the demand registering means senses that the car is in the given zone, it is conditioned for travel in said first direction and has not yet passed the landing at which the landing call is registered traveling in said first direction unless such car has been assigned by the assigning means to serve one of the following demands, (1) a demand for service in the direction opposite the first direction or (2) a demand for service in the first direction in a zone beyond the given zone in said first direction.

12. The system of claim 10 in which a car is in position to satisfy a landing call tending to create a demand for service in a first direction in a given zone when the demand registering means senses that the car is conditioned for travel in the first direction, is in a zone encountered prior to the given zone by a car traveling in the first direction, is not assigned to landing calls in the direction opposite to the first direction, and there are no landing calls in the first direction between the car and the given zone.

13. The system of claim 12 wherein the car is not in position unless the demand registering means also senses that the car was conditioned for travel in said first direction before a demand for service in the first direction in the given zone is created by the demand registering means and given preference by the demand preference means.

14. The system of claim 10 in which a car will soon be in position to satisfy a landing call tending to create a demand for service in a first direction in a given zone when the demand registering means senses that the car is conditioned for travel in a direction opposite to the first direction, is in the given zone which zone is the last zone in the system in the direction in which the car is conditioned to travel, there are landing calls in other zones for service in the first direction and there is no car assigned and no car is in position to satisfy said other landing calls.

15. In an elevator system, a structure having a plurality of vertically-spaced floors, a plurality of said floors being divided into two zones, a high zone and a low zone with each zone comprising at least one floor, a plurality of elevator cars, means mounting the elevator cars for movement relative to the structure to serve the floors, up floor call registering means operable for registering a call for up elevator service from each of a plurality of said floors, down floor call registering means operable for registering a call for down elevator service from each of a plurality of said floors, availability means conditioning each of the elevator cars in response to predetermined conditions to be an available car for answering calls registered by either of the call registering means, designating means operative to identify each of the available cars including means for associating an available car with one of the zones, demand registering means effective to register a plurality of demands for service including demands for service in each direction and each zone in response to predetermined conditions including registration of a call in the particular zone in the particular direction by the call registering means, assigning means for assigning an available car to serve the demands registered by the demand registering means, said available car to be selected from the designated available cars in a predetermined order determined by the particular demand, control means for initiating movement of the elevator cars in response to requirements for service including the movement of assigned cars to serve a particular demand, and direction conditioning means conditioning a car dispatched by said control means in a given direction to continue traveling in said given direction until its trip is complete or until it reaches a floor at which it must reverse direction in order to serve a floor call to which the car is assigned by the assigning means.

16. In the elevator system of claim 15 wherein the associating means includes means to change the association of a particular car with respect to the zones in response to the movement of the other cars.

17. The elevator system of claim 15 wherein the associating means is effective to associate the first car to become available in a first zone with that first zone, to associate the second car to become available in said first zone with the second zone and to reassociate the second car with the first zone when said first car is no longer conditioned as available by the availability means.

18. The elevator system of claim 17 including car call registering means for each of the elevator cars, each of the car call registering means being operable for registering a call for any of a plurality of floors which may be desired by load within the associated elevator car, a main floor and a basement floor below the main floor, the main floor and the basement being the two lowest floors in the structure wherein a car can be conditioned as an available car by the availability means when it is located in the basement provided predetermined conditions are met, said conditions to include the conditions that, (1) no car calls are registered in the car by the car call registering means and (2) a demand is registered by the demand registering means, wherein the associating means associates a car which becomes available at the basement floor with the lowest zone with which no other car is assigned, wherein a car which becomes available in the basement is available to be selected by the assigning means along with other available cars to be assigned to demands, and wherein the demand registering means includes means for registering demands for service in the basement.

19. The elevator system of claim 18 wherein the car must also not be needed at the main floor in order to be conditioned as available in the basement and wherein the control means is effective to return a car in the basement to the main floor if it is not conditioned as available by the availability means, no car calls are registered in the car for floors above the main floor.

20. The elevator system of claim 19 including down peak traffic sensing means operable to a first condition when said means senses a predominant requirement for service in the down direction and otherwise operable to a second condition, wherein a car is not needed at the main floor when at least one car is located at the main floor or when said down peak traffic sensing means is in said first condition.

21. The elevator system of claim 17 including demand preference means effective to select demands one at a time in a predetermined order to be assigned an available car by the assigning means and including traffic sensing means by which the order of selection may be altered in response to predetermined traffic conditions.

22. The elevator system of claim 21 wherein the traffic sensing means is effective to alter the order in which the demand preference means recognizes demands to give down demands preference over up demands in response to indications of a predominant requirement for service in the down direction.

23. The elevator system of claim 22 wherein the demand preference means is effective to alternate preference between down demands in the high zone and the low zone when down demands are registered in both zones at once giving first preference to the first one of the down demands to be registered.

24. The elevator system of claim 21 wherein the demand registering means includes means for denying registration of demands and cancelling the registration of demands already registered when the demand registering means senses that a car is in position or will soon be in position to serve the floor call tending to create the demand.

25. The elevator system of claim 24 wherein the demand registering means will sense that a car is in position to serve a floor call tending to create a demand when conditions including the following are met: (1) a car is located in the same zone as the floor call, (2) the car is conditioned by the direction conditioning means to travel in the same direction as the floor call, (3) the car has not yet passed the floor at which the floor call is registered traveling in the direction of the floor call, and (4) the car is not assigned to serve a demand for service in the direction opposite to that of the floor call.

26. The elevator system of claim 25 wherein the demand registering means must also sense that the car is not assigned to demands in the other zone for service in the same direction as that indicated by the floor call before denying the registration of or cancelling the demand for service in response to the floor call.

27. The elevator system of claim 24 wherein the demand registering means senses that a car is in position to serve a floor call tending to create a demand for service in a first direction when conditions including the following are met: (1) the car is located in the zone other than the zone in which the floor call is located, said other zone being encountered prior to the zone in which the floor call is located by a car traveling in said first direction, (2) the car is conditioned by the direction conditioning means to travel in said first direction, (3) the car is not assigned to serve a demand for service in the direction opposite to said first direction, and (4) there are no floor calls in the zone in which the car is located between the car and the floor call tending to create the demand for service in the first direction.

28. The elevator system of claim 27 wherein the demand registering means will not cancel a demand which has been degistered when the demand has been given preference by the demand preference means prior to the time the car in the other zone is conditioned by the direction conditioning means for travel in the first direction with no floor calls for service in the other zone in the first direction between the car and the floor call.

29. The elevator system of claim 28 wherein the demand registering means will not cancel a down demand in the low zone if the down demand in the low zone is given preference by the demand preference means prior to the time that a car in the high zone is conditioned by the direction conditioning means for down travel with no down floor calls registered below it in the high zone.

30. The elevator system of claim 24 wherein the demand registering means senses that a car will soon be in position to serve a floor call tending to create a demand when conditions including the following are sensed: (1) that the floor call is for service in a direction toward the other zone, (2) that the car is located in the same zone as the floor call, (3) that the car is conditioned by the direction conditioning means for travel in the direction opposite to that of the floor call, (4) that there are no available cars in the zone, (5) that there are other floor calls in the other zone for service in the same direction as the floor calls tending to create the demand and (6) that no car is assigned or in position to answer the other floor calls.

31. The elevator system of claim 30 wherein (1) the floor call tending to create the demand is a down floor call in the high zone tending to create a down demand in the high zone, (2) the car which will soon be in position to serve the down floor call in the high zone is located in the high zone, (3) the car is conditioned to travel in the up direction, (4) there are no available cars located in the high zone, (5) there are down floor calls registered in the low zone, and (6) there are no cars assigned or in position to answer the down floor calls registered in the low zone.

References Cited

UNITED STATES PATENTS 3,292,736 12/1966 Savino et al. _____ 187—29
3,378,107 4/1968 Madison _____ 187—29

ORIS L. RADER, Primary Examiner

W. E. DUNCANSON, JR., Assistant Examiner